(12) United States Patent
Alright et al.

(10) Patent No.: US 8,172,938 B2
(45) Date of Patent: May 8, 2012

(54) HEAT RESISTANT AND FIRE RETARDANT MATERIALS AND METHODS FOR PREPARING SAME

(75) Inventors: John Alright, Niceville, FL (US); David Wayne Taylor, Niceville, FL (US)

(73) Assignee: Specialty Concrete Design, Inc., Niceville, FL (US)

( * ) Notice: Subject to any disclaimer, the term of this patent is extended or adjusted under 35 U.S.C. 154(b) by 0 days.

(21) Appl. No.: 13/002,184

(22) PCT Filed: Jun. 30, 2009

(86) PCT No.: PCT/US2009/049319
§ 371 (c)(1),
(2), (4) Date: Mar. 21, 2011

(87) PCT Pub. No.: WO2010/002934
PCT Pub. Date: Jan. 7, 2010

(65) Prior Publication Data
US 2011/0155019 A1    Jun. 30, 2011

Related U.S. Application Data

(60) Provisional application No. 61/133,761, filed on Jul. 1, 2008.

(51) Int. Cl.
| | |
|---|---|
| C04B 28/04 | (2006.01) |
| C04B 14/00 | (2006.01) |
| C04B 14/04 | (2006.01) |
| C04B 40/00 | (2006.01) |
| C09D 5/00 | (2006.01) |
| C09D 7/12 | (2006.01) |

(52) U.S. Cl. ........ 106/672; 106/675; 106/676; 106/677; 106/716; 106/733; 106/737; 106/816

(58) Field of Classification Search .................. 106/672, 106/675, 737, 816, 676, 677, 716, 733; 252/601; 428/920, 921
See application file for complete search history.

(56) References Cited

U.S. PATENT DOCUMENTS

| | | | | |
|---|---|---|---|---|
| 6,644,405 | B2 * | 11/2003 | Vijn et al. ..................... | 166/293 |
| 6,776,237 | B2 * | 8/2004 | Dao et al. ..................... | 166/292 |
| 6,783,799 | B1 * | 8/2004 | Goodson ....................... | 427/140 |
| 6,814,798 | B2 * | 11/2004 | Vijn et al. ..................... | 106/724 |
| 6,858,074 | B2 * | 2/2005 | Anderson et al. ............. | 106/724 |
| 6,957,702 | B2 * | 10/2005 | Brothers et al. ............... | 166/293 |
| 2002/0060282 | A1 * | 5/2002 | Shirakawa et al. ............. | 249/1 |
| 2005/0011412 | A1 * | 1/2005 | Vijn et al. ..................... | 106/676 |
| 2005/0109507 | A1 * | 5/2005 | Heathman et al. ............. | 166/292 |
| 2005/0284340 | A1 * | 12/2005 | Vickers et al. ................ | 106/802 |
| 2006/0272819 | A1 * | 12/2006 | Santra et al. .................. | 166/292 |
| 2007/0224362 | A1 * | 9/2007 | Briand et al. ................. | 427/427.4 |

* cited by examiner

*Primary Examiner* — Anthony J Green
(74) *Attorney, Agent, or Firm* — Knobbe Martens Olson & Bear LLP

(57) ABSTRACT

A silica cement blend having an insulating, fire retarding and high temperature characteristic capable of withstanding temperatures ranging from ambient to greater than 40000 F without degradation of the concrete structure. In addition to its high temperature capabilities the blend can be produced as ultra light weight to heavy weight concrete. The silica based mixture when added to cementitious materials such as Portland cement, Class C Fly Ash, silica fume and other cementitious materials. Presented also are methods for reducing fire damage by coating interior/exterior walls, ceiling, and roofs of a building with a water based latex coating containing a fire retardant material and low heat conductivity silicas. Methods for painting internal/external walls, ceilings, and roof are also presented. This coating retains thermal blocking properties comprised of processed, expanded and/or finely milled, pyrogenic silicas and micro spheres in combination of but not limited to, one, two or more component water based polymer/copolymer latex binders and a water born fluoropolymer emulsion. The combined properties of these elements create a coating similar to paint with a high level of thermatic resistance which slows the composition break-down from fire, extreme temperatures, and restricts the thermal conductivity which helps to preserve the integrity of the substructure or underlying materials. The properties of this coating reduce or slow the potential of catastrophic fire by retarding flashover and protecting the under structure; which in turn assist fire fighters and rescue personnel by helping to retard the potential of a catastrophic fire.

11 Claims, No Drawings

HEAT RESISTANT AND FIRE RETARDANT MATERIALS AND METHODS FOR PREPARING SAME

CROSS-REFERENCE TO RELATED APPLICATIONS

This application is the U.S. National Phase under 35 U.S.C. §371 of International Application No. PCT/US2009/049319, filed Jun. 30, 2009, which claims priority to U.S. Provisional Patent Application No. 61/133,761, filed Jul. 1, 2008.

FIELD OF THE INVENTION

Heat resistant, thermal, insulating, non-conductive, fire-retarding compositions, formulations containing same, and methods of use are provided, along with methods for formulation of hydraulic cement for use in making concrete, and mortar. More particularly, the formulation of insulative (insulating), high temperature hydraulic cement used for making high temperature concrete and masonry products which can withstand temperatures between 300° F. and 4200° F. for periods of 1 minute or longer.

BACKGROUND OF THE INVENTION

Non-conductive and heat resistant materials are those that keep heat from absorbing into the exposed material. Fire retardants are chemicals that can be applied to a combustible object to reduce flammability or retard the spread of fire over its surface. They are commonly applied to textiles and building materials where fire resistance is particularly desirable.

Despite the effectiveness of intumescent coatings and fire retardants in protecting flammable surfaces, there are certain disadvantages associated with their use. For example, the intumescent reaction can produce large bubbles in the coating which, upon rupture, may expose the underlying surface. Such localized regions of exposed surface are thereby rendered unprotected and may provide sites at which combustion of the surface can occur. Many fire retardants are synthetic phosphorus-containing compounds; however, questions concerning the health and safety as well as the environmental impact of some of these chemicals have arisen.

SUMMARY OF THE INVENTION

Fire retardant and fire resistant materials that possess one or more properties such as greater durability, greater strength, reduced toxicity, or other properties are desirable.

Accordingly, in a first embodiment, a cement blend for making concrete is provided, the cement blend comprising: 60-90 wt. % Portland cement; 0.1-6 wt. % fumed silica having an average particle size of from 1 to 150 microns; 1-9 wt. % hollow microspheres.

In an aspect of the first embodiment, the cement blend further comprises 0.1-10 wt. % titanium dioxide.

In an aspect of the first embodiment, the cement blend further comprises 0.1-7 wt. % perlite; 0.1-20 wt. % fused silica; and 0.1-40 wt. % fly ash.

In an aspect of the first embodiment, the cement blend further comprises 60-88 wt. % Portland cement; 0.1-3 wt. % fumed silica; 1-4.5 wt. % microbeads; 0.1-5 wt. % titanium dioxide; 0.1-3.6 wt. % perlite; 0.1-10 wt. % fused silica; and 0.1-30 wt. % fly ash.

In an aspect of the first embodiment, the hollow microspheres have a mean particle size of 80 microns+/−8 microns and a particle size of from 10 to 500 microns.

In an aspect of the first embodiment, the fused silica has an average particle size of from 1 to 150 microns.

In an aspect of the first embodiment, all solid components of the mixture have an average particle size of from 1 to 150 microns.

In a second aspect, a method is provided for forming the cement blend of the first aspect, the method comprising, in sequence: combining Portland cement and titanium dioxide to obtain a combination; mixing the combination for two to twenty minutes; adding fumed silica and Portland cement to the combination; mixing the combination for two to twenty minutes; adding perlite and Portland cement to the combination; mixing the combination for two to twenty minutes; adding fused silica and fly ash to the combination; mixing the combination for two to twenty minutes; adding microspheres; mixing the combination for two to twenty minutes; adding perlite and Portland cement to the combination; and mixing the combination for two to twenty minutes; whereby the cement blend according to the first aspect is obtained.

In an aspect of the second embodiment, the method comprises, in sequence: combining Portland cement and titanium dioxide to obtain a combination; mixing the combination for five to fifteen minutes; adding fumed silica and Portland cement to the combination; mixing the combination for five to fifteen minutes; adding perlite and Portland cement to the combination; mixing the combination for five to fifteen minutes; adding fused silica and fly ash to the combination; mixing the combination for five to fifteen minutes; adding microspheres; mixing the combination for five to fifteen minutes; adding perlite and Portland cement to the combination; and mixing the combination for five to fifteen minutes.

In a third embodiment, a method for forming concrete is provided, the method comprising, in sequence: adding water to a blender; adding a cement blend according to the first aspect to the blender to obtain a combination; mixing the combination for two to twenty minutes; adding aggregate to the blender; mixing the combination for two to twenty minutes; adding superplasticer to the blender; mixing the combination for two to twenty minutes; adding sand to the blender; and mixing the combination for two to twenty minutes; whereby a concrete is obtained.

In an aspect of the third embodiment, the method comprises, in sequence: adding water to a blender; adding a cement blend according to the first embodiment to the blender to obtain a combination; mixing the combination for five to fifteen minutes; adding an aggregate to the blender; mixing the combination for five to fifteen minutes; adding a superplasticer to the blender; mixing the combination for five to fifteen minutes; adding sand to the blender; and mixing the combination for five to fifteen minutes; whereby a concrete is obtained.

In a fourth embodiment, a concrete comprising the cement blend according to the first aspect and an aggregate is provided, wherein the cement blend comprises 45-25 wt. % of the concrete.

In a fifth embodiment, a fire retardant coating is provided, the coating comprising: a fire retardant material; a white latex liquid; a fluoropolymer; and a mixture of low heat conductivity silicas.

In an aspect of the fifth embodiment, the coating further comprises titanium dioxide, wherein the titanium dioxide comprises up to 14 wt. % of the coating.

In an aspect of the fifth embodiment, the coating further comprises at least one fire retardant chemical, wherein the at least one fire retardant chemical comprises up to 38 wt. % of the coating.

In an aspect of the fifth embodiment, the low heat conductivity silicas comprise up to 14 wt. % of the coating.

In an aspect of the fifth embodiment, the low heat conductivity silicas are selected from the group consisting of fumed silica, ceramic hollow beads, fused silica, perlite, and vermiculite.

In a sixth embodiment, a thermal coating is provided, the coating comprising: 5-15 wt. % perlite; 30-40 wt. % vinyl acrylic copolymer; and 30-40 wt. % acrylic latex copolymer.

In an aspect of the sixth embodiment, the coating further comprises 4-16 wt. % titanium dioxide.

In an aspect of the sixth embodiment, the coating further comprises 3-8 wt. % hollow microspheres.

In a seventh embodiment, a method for making the thermal coating of the sixth embodiment is provided, comprising: adding water and titanium dioxide to form a combination; mixing the combination for five to fifteen minutes; adding a vinyl acrylic copolymer to said mixture; mixing the combination for two to ten minutes; adding a perlite to said mixture; and mixing the combination until substantially smooth; adding an acrylic latex polymer; and mixing the combination thirty minutes; whereby the thermal coating of the sixth embodiment is obtained.

DETAILED DESCRIPTION OF THE PREFERRED EMBODIMENT

The following description and examples illustrate some exemplary embodiments of the disclosed invention in detail. Those of skill in the art will recognize that there are numerous variations and modifications of this invention that are encompassed by its scope. Accordingly, the description of a certain exemplary embodiment should not be deemed to limit the scope of the preferred embodiments, but the invention is not limited thereto but only by the claims.

Moreover, the terms top, bottom and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Coatings

Non-conductive and heat resistant materials are those that keep heat from absorbing into the exposed material. They are commonly formulated with ceramic beads as an insulating layer within the material.

Fire retardants are chemicals that can be applied to a combustible object to reduce flammability or retard the spread of fire over its surface. They are commonly applied to textiles and building materials where fire resistance is particularly desirable. Many fire retardants are synthetic phosphorus-containing compounds; however, questions concerning the health and safety as well as the environmental impact of some of these chemicals have arisen.

Fire-protective coatings are broadly classified as ceramic-based coatings, ablative coatings, intumescent coatings, and vapor-producing (sublimation) coatings; although in practice there is substantial overlap of their chemical and physical fire-retarding mechanisms.

Some conventional flame-retardant coatings employ so-called intumescent materials. These are materials that react in the presence of heat or flame to produce incombustible residues ("char") which expand to cellular foam having good insulation properties. Generally, intumescent materials comprise a polyhydric substance, such as a sugar or polyol, and an intumescent catalyst which can be a dehydrating agent, such as phosphoric acid, usually introduced as a salt or ester. Upon heating, the acid catalyzes the dehydration of the polyol to polyolefinic compounds which are subsequently converted to carbon char. "Blowing agents" which release nonflammable gases upon heating can be employed to facilitate formation of the cellular foam.

Despite the effectiveness of intumescent coatings in protecting flammable surfaces, there are certain disadvantages associated with their use. For example, the intumescent reaction can produce large bubbles in the coating which, upon rupture, may expose the underlying surface. Such localized regions of exposed surface are thereby rendered unprotected and may provide sites at which combustion of the surface can occur.

Generally, various fire retardant compositions are known. See, for example, U.S. Pat. No. 5,989,706; U.S. Pat. No.

5,925,457; U.S. Pat. No. 5,645,926; U.S. Pat. No. 5,603,990; U.S. Pat. No. 5,064,710; U.S. Pat. No. 4,635,025; U.S. Pat. No. 4,345,002; U.S. Pat. No. 4,339,357; U.S. Pat. No. 4,265,791; U.S. Pat. No. 4,241,145; U.S. Pat. No. 4,226,907; U.S. Pat. No. 4,221,837; U.S. Pat. No. 4,210,452; U.S. Pat. No. 4,205,022; U.S. Pat. No. 4,201,677; U.S. Pat. No. 4,201,593; U.S. Pat. No. 4,137,849; U.S. Pat. No. 4,028,333; U.S. Pat. No. 3,955,987 and U.S. Pat. No. 3,934,066. Intumescent fire retardant can include latex. Various companies, for example, the Cary Company, Addison, Ill., U.S.A., Kemco International Associates, St. Pete, Fla., U.S.A., and Verichem, Inc., Pittsburgh, Pa., U.S.A., market components for paints and coatings including flame retardant additives, smoke suppressant additives, and biocides. Various fire retardants are described in, e.g., U.S. Pat. No. 6,207,085; U.S. Pat. No. 5,997,758; U.S. Pat. No. 5,882,541; U.S. Pat. No. 5,626,787; U.S. Pat. No. 5,165,904; U.S. Pat. No. 4,744,965; U.S. Pat. No. 4,632,813; U.S. Pat. No. 4,595,414; U.S. Pat. No. 4,588,510; U.S. Pat. No. 4,216,261; U.S. Pat. No. 4,166,840; U.S. Pat. No. 3,969,291 and U.S. Pat. No. 3,513,114.

Reflective paints, elastomeric coatings and various surface coatings in recent years have become popular as a cost effective resource for reducing energy cost by reflecting the sun's rays and reducing heat buildup in metal, wood, stucco and concrete buildings. These coatings are a very efficient moister barrier to prevent and stop leaky roofs and walls and can often be quickly and easily applied by airless spray rigs, brushed and rolled on by hand.

In some cases the reflective paints and coatings can be colored with a surface paint and/or pigmented both pre and/or post production for finishes to give the desired appearance and need for a particular application. Disadvantageously, tinted paints and coatings are far less reflective and will absorb heat more easily, critically diminish the products ability to block heat and conductivity. Also pigmented paints and coatings will not expand and contract efficiently with the substrate surface due the varying absorption of the ambient and radiant heat or the lack there of and therefore are particularly susceptible to peeling and blistering.

Although heat can be partially reflected, thus reducing the absorption for radiant temperatures; paints and coatings are limited in their ability to repel or block absorption and conductivity of heat or cold, any temperatures absorbed will transfer to the substrate reducing its efficiency. Additionally, the coating will deteriorate from extreme temperature changes and its performance and life span are drastically reduced and will continue to become less efficient as the coating weakens.

Fire retardant coatings as surface coatings in recent years have become popular as a resource for reducing damage to metal, wood, stucco and concrete buildings and other substrates, due to fire outbreaks. This type of coating is quickly and easily applied by airless spray rigs, brushed and rolled on by hand, dipped or sponged on. Fire retardant coatings can leave a clean smooth appearance to create an aesthetically pleasing finish. The coatings can be pigmented both pre and/or post production for finishes to give the desired appearance and need for a particular application. Most advantageously, the fire retardant coatings can slow the acceleration of fire inside a burning structure, possibly saving lives and reducing the potential of costly structural damage.

If a fire is in an interior space, in the presence of a fire resistant coating; that resistance of the fire retardant coatings to the flame will repel the heat back into the interior space, thus accelerating the temperature within that space, creating a thermal blanket. The thermal blanketing will increase until all materials within the space will reach a critical point of combustion (this would include the fire retardant material), and the entire area can explode. Thermal blanketing can accelerate a fire at a rapid rate, thus creating a more severe situation than without the fire coating. Some coatings have a defense against thermal blanketing, but are normally toxic when heat is introduced, and are deadly to humans and animals or the coatings defense to thermal blanketing only last for a few seconds. However, many of the coatings above, in this section contain hazardous materials.

Hence, from the forgoing, there is a need for a coating that will substantially block and resist thermal absorption and conduction, thus enhancing the longevity of the coating and increasing its ability to reduce energy consumption. Additionally, there is a need for a fire retardant coating that will substantially resist flashover, block thermal absorption and conduction (that will in turn protect the substructure), and dissipate the heat to reduce the tendency of thermal blanketing. In addition to the above, it is desirable that the preferred materials can exceed the standards of the EPA and GS-11 Green Seal Environmental Standard.

Concrete

Concrete comprising normal Portland cement absorbs heat from the environment. When temperatures exceed 100° F. daily, concrete absorbs heat and that heat is stored in the concrete. During the night some of the heat is re-emitted to the air but much of the heat is retained in the concrete when the sun again begins to store heat in the concrete. This means the heat continually builds up in the concrete and eventually this heat is re-emitted on the inside of the structure. This increases the cost to cool buildings and homes with concrete roofs. The insides of some concrete roofs, which are also the ceilings in buildings, can reach 120° F. in the summer months. This occurs in many areas of Japan and Guam where nearly all buildings are made of concrete to help withstand the extreme weather from cyclones (hurricanes).

High Temperature Concretes

Only one high temperature concrete is currently commercially available: FireRok™ high temperature concrete, available from CeraTech, Inc. of Alexandria, Va. While this product is advertised as being able to withstand temperatures up to 1800° F., it has failed test criteria when large batches have been tested with the military, as the material sets up and hardens in the trucks before it can be poured. Hence, there is a need for a cement mix and concrete that will substantially block and resist thermal absorption and conduction, thus enhancing its longevity and safety.

As employed herein, all terms are intended to have their ordinary meaning in the art unless specifically defined.

The terms "non-flammable" and "smoke-free" as used herein are broad terms, and are to be given their ordinary and customary meaning to a person of ordinary skill in the art (and are not to be limited to a special or customized meaning), and refer without limitation to materials which pass American Society for Testing and Materials ("ASTM") E84-04 with a flame spread index of 0 and a smoke index of 0, respectively.

The terms "substantially non-flammable" and "substantially smoke-free" as used herein are broad terms, and are to be given their ordinary and customary meaning to a person of ordinary skill in the art (and are not to be limited to a special or customized meaning), and refer without limitation to materials which achieve a Class A or Class B, preferably Class A, rating under ASTM E84-04.

The term "intumescent" as used herein is a broad term, and is to be given its ordinary and customary meaning to a person of ordinary skill in the art (and is not to be limited to a special or customized meaning), and refers without limitation to a substance which swells as a result of heat exposure, thus increasing in volume, and decreasing in density.

The term "pyrolitic" as used herein is a broad term, and is to be given its ordinary and customary meaning to a person of ordinary skill in the art (and is not to be limited to a special or customized meaning), and refers without limitation to decomposition or transformation of a chemical due to heat.

The term "wave diffraction" as used herein is a broad term, and is to be given its ordinary and customary meaning to a person of ordinary skill in the art (and is not to be limited to a special or customized meaning), and refers without limitation to various phenomena which occur when a wave encounters an obstacle. It is described as the apparent bending of waves around small obstacles and the spreading out of waves past small openings. Very similar effects are observed when there is an alteration in the properties of the medium in which the wave is travelling, for example a variation in refractive index for light waves or in acoustic impedance for sound waves and these can also be referred to as diffraction effects. Diffraction occurs with all waves, including sound waves, water waves, and electromagnetic waves such as visible light, x-rays and radio waves. As physical objects have wave-like properties (at the atomic level), diffraction also occurs with matter and can be studied according to the principles of quantum mechanics. While diffraction occurs whenever propagating waves encounter such changes, its effects are generally most pronounced for waves where the wavelength is on the order of the size of the diffracting objects. If the obstructing object provides multiple, closely-spaced openings, a complex pattern of varying intensity can result. This is due to the superposition, or interference, of different parts of a wave that traveled to the observer by different paths. The presence of amorphous silicas such as perlite and/or fumed silica create a matrix at a molecular level when suspended at the proper density in the preferred solutions which will form a wave diffractive barrier against radiant waves which will in turn be more prone to be reemitted in the direction in which it came rather than be absorbed into the material. When the preferred material is accompanied by materials with reflective properties and/or microspheres this ability is enhanced.

The invention will be described by a detailed description of several preferred embodiments of the invention. It is clear that other embodiments of the invention can be configured according to the knowledge of persons skilled in the art without departing from the true spirit or technical teaching of the invention, the invention being limited only by the terms of the appended claims.

Heat Resistant, Thermal, and Non-Conductive Coatings

In preferred embodiments, heat resistant, thermal, or non-conductive compositions and methods for their use and manufacture are provided. The compositions of preferred embodiments preferably incorporate fumed silica, fused silica and Perlite grade 416 (mean particle size 3.9 microns, surface area 3.65 m$^2$/g). These compositions exhibit heat resistant properties as well as non-conductive properties.

In preferred embodiments, fire retardant compositions, e.g., latex paints incorporating the fire retardant compositions and methods for their use and manufacture are provided. The fire retardant compositions of preferred embodiments preferably incorporate an intumescent material, a fluoropolymer, a latex, and a mixture of low heat conductivity silica materials to provide fire retardant properties. The fire retardant compositions of preferred embodiments exhibits reduced intumescent properties without a significant impact in fire retardant capabilities when compared to conventional fire retardant compositions.

While the fire retardant compositions of preferred embodiments are particularly well suited for use in paints, especially latex paints, they are also suitable for use in other coating materials and coating compositions, as discussed herein. Likewise, while the compositions of preferred embodiments are particularly desirable for their fire retardant capabilities, they may also possess additional desirable properties, e.g., mold prevention, insulation properties, and the like.

The mixture can be combined with a latex which can be natural or synthetic. The latex liquids employed in the preferred embodiments are preferably white in color, although other colors can also be advantageously employed. Aqueous emulsions are particularly preferred; however, any suitable liquid matrix can be employed (e.g., alcohols, other solvents and mixtures thereof with water).

The preferred elastomeric liquid for use in preferred embodiments is marketed under the product name RHOPLEX™ EC-1791, 100% acrylic latex polymer and produced by ROHM & Haas; now owned by DOW®. The composition comprises 55% solids, with the remainder of water, including biocides and other preservatives and additives. While RHOPLEX™ EC-1791 is particularly preferred, any other acrylic latex polymer liquid possessing the similar properties or suitable for similar uses can be employed in the coatings. Any reference to elastomeric will be referred by reference to the aforementioned description in this paragraph.

A vinyl acrylic copolymer suitable for use in compositions of preferred embodiments is marketed under the product name PD-0124, Fulatex Polymer Products® produced by H.B. Fuller Company, (St. Paul, Minn.). While the PD-0124 Fulatex is particularly preferred, any other vinyl acrylic copolymer, acrylic polymer, acrylic copolymer, vinyl copolymer or vinyl polymer possessing the similar properties or suitable for similar uses can be employed in the coatings. Any reference to Vinyl Acrylic Copolymer liquid will be referred by reference to the aforementioned description in this paragraph.

The preferred latex polymer is commonly referred to as styrene/butadiene polymer latex. The composition comprises up to 65% styrene/butadiene. While the styrene/butadiene polymer latex is particularly preferred, any other latex liquid possessing similar properties or suitable for similar uses can be employed in the coatings.

The preferred fluoropolymer binder for use in preferred embodiments includes product name FE-4400 fluoroethylenealkylvinylether polymer. This polymer is particularly preferred in an aqueous emulsion. While FE-4400 fluoroethylenealkylvinylether polymer is particularly preferred, any other fluoropolymer emulsion possessing the similar properties or suitable for similar uses can be employed in the coatings.

The preferred perlite is sourced from SOCORRO ORE and has the generic name of volcanic glass (CAS#93763-70-30), the chemical name is amorphous siliceous mineral-silicate and the formula is Sodium-potassium-aluminum-silicate of variable composition. This material is expanded at temperatures of 850° F. or greater and is than milled to the desired micro particle size. While this particular perlite is preferred, any other perlite or vermiculite of varying particle size (expanded or milled), possessing the similar properties or suitable for similar uses can be employed in the coatings.

Grade 416 and 476 perlites, e.g., as are available under the DICALITE® trademark from Dicalite Europe nv, Gent, Belgium, are particularly preferred; however, any suitable perlite can be employed. While Dicalite 416 and 476 (measured in microns), is particularly preferred for its fine particle size, (useful for smooth finished surfaces), any other perlite of varying particle size; expanded or milled, possessing the similar properties or suitable for similar uses can be employed in the coatings. The definition of any reference to perlite will be referred by reference to the aforementioned description of this paragraph. Perlite in the natural state is a dense, glassy rock formed by volcanic action. When crushed and treated under proper conditions, it pops like popcorn, expanding to 20 or more times its original volume. Perlite is an amorphous mineral consisting of fused sodium potassium aluminum silicate. DICALITE® perlite is processed at temperatures exceeding 800° C. (1500° F.) which eliminates organic matter. They have extremely low solubilities in mineral and organic acids at both low and high temperatures.

The preferred fumed silica is marketed under the product name Cab-o-Sil® M-5 is produced by Cabot Corporation of Boston, Mass. While Cab-o-Sil® M-5 is particularly preferred, any other fumed silica of varying micron size, possessing similar properties or suitable for similar uses can be employed in the coatings. The definition of any reference to fumed silica will be referred by to the aforementioned description of this paragraph. Cabosil is a synthetic, amorphous, untreated fumed silicon dioxide. Cabosil is an extremely fine particle sized silica (silicon-dioxide, $SiO_2$) aerogel. It is pure white and free-flowing. Each volume contains about 94% dead air space, with a density of only 2.3 lb/cu ft.

The preferred SLW 150 microspheres for use in the preferred embodiments are marketed under the product name Extendospheres™ and produced by Sphere One Inc. of Chattanooga, Tenn. While Extendospheres™ is particularly preferred, any other microspheres of varying size, possessing the similar properties or suitable for similar uses can be employed in the coatings. The hollow microspheres can be fabricated from, e.g., ceramic, glass, polymer, or any other suitable material.

| TYPICAL PROPERTIES OF EXTENDOSPHERES ™ SLW-150 CERAMIC HOLLOW SPHERES | |
|---|---|
| Physical Form | Free-Flowing Powder |
| Appearance | White |
| Particle Size | Microns |
| SLW-150 | 10-150 |
| Mean Particle Size SLW-150 | 80 +/− 8 microns |
| Bulk Density | 21.5 lbs/ft$^3$ |
| Density | <0.68 +/− .05 g/cc |
| Deformation Temperature | >1500° C. |
| Compressive Strength | <10% @ 3000 psi |
| Hardness, Moh's Scale | 5 |

In one embodiment of the composition, the coating is a vinyl acrylic copolymer. The particularly preferred vinyl acrylic copolymer is blended with $TiO_2$. Perlite is added to help create a durable, thermally resistant coating.

In another embodiment, the combination of a vinyl acrylic copolymer is blended with $TiO_2$, perlite and a water-based elastomeric liquid to create a durable elastomeric coating.

In yet another embodiment, the coating composition is made up of a 2-part emulsion comprising of a vinyl acrylic copolymer, blended, $TiO_2$, perlite and a styrene/butadiene. These two emulsions in combination with the additional preferred components create a thin, tough heat resistant non-conductive coating.

In yet another embodiment, the coating composition is made up of a three part emulsion comprising of a vinyl acrylic copolymer, a water-born fluoropolymer emulsion. The two emulsions are blended with $TiO_2$, perlite and a water-based elastomeric copolymer to create a more durable elastomeric coating.

In another possible embodiment, the coating composition is made up of a three part emulsion comprising of a vinyl acrylic copolymer, a styrene/butadiene blended with $TiO_2$, perlite and a water-based elastomeric copolymer to create a more thematically resistant elastomeric coating.

All of the aforementioned embodiments are very resistant to thermal absorption and thermal conduction. Additionally, the presence of the $TiO_2$ in combination with the perlite and/or fumed silica substantially increases the reflective properties. The combination of the strength of the vinyl copolymer and the elastic durability and adhesion of the elastomeric make for a tough and adaptable coating for any substrate and in a variety of extreme environments. The addition of a fluoropolymer and/or the styrene/butadiene only increases the performance of all of these properties. Any one of these emulsions can be varied, replaced or combined to achieve the best results of the required application.

In an alternative embodiment, a polyurethane solution can accompany and/or replace any or all of the preferred liquid embodiments to increase the strength and/or hardness of the paint or coating. This is especially true in combination with the elastomeric and/or the vinyl copolymer.

In another embodiment, the addition of microspheres to any one of the aforementioned embodiments can decrease the absorption of heat into the coating. Microspheres can reduce the strength, rheological properties and prolonged existence of most coatings; advantageously the presence of perlite or fumed silica removes this tendency.

When introducing the micro-spheres to the aforementioned matrices, the addition of toners or colorants can be made. While the reflectivity is reduced once a non-white pigment is introduced, the presence of the micro-spheres substantially offset this negative by decreasing the thermal absorption. Because of this factor the variations of the preferred coatings can be pigmented because of the introduction of micro-spheres or covered with a color variant of the preferred embodiments possessing the micro-spheres. This allows the layering of various versions of the preferred embodiments without the worry of separation, blistering or pealing.

The coatings of preferred embodiments can use fumed silica, a defoamer surfactant to decrease the air bubbles created in the premixing, transportation, movement or post mixing, thus resisting separation and blistering when dry. Additionally, the coating may comprise additives such as water, thickening agents to increase viscosity, biocides and pesticides for the shelf life and product longevity and optionally a plasticizer to toughen the coating and increase the elasticity.

Coating compositions can further comprise various conventional paint additives, such as dispersing aids, anti-settling aids, wetting aids, extenders, stabilizers, antifoams, texture-improving agents and/or antiflocculating agents. The amounts of such additives are routinely optimized by the ordinary skilled artisan so as to achieve desired properties in the coating, such as thickness, texture, handling, and fluidity.

Example 1

Thermal Coating Formulation

In the preferred method of creating a thermally resistant coating, the composition takes into consideration five requirements: (1) creating an insulating barrier to retard the penetration of heat through the coating, achieved by using fumed silica and/or perlite and/or vermiculite and/or other materials maintaining similar properties, (2) creating a disruptive layer that will diffract any heat introduced to the coating and reduce the remittance back into the area of the source thus reducing the thermal blanketing affect, (3) maintaining the coatings' integrity under extreme environmental temperatures by using the aforementioned materials in combination with the preferred emulsions; such as the vinyl acrylic copolymer, the elastomeric acrylic latex polymer, the styrene/butadiene polymer, the fluoroethylenealkylvinylether, and/or other similar emulsions containing similar physical properties, can be balanced with the proper level of the preferred solids to achieve this requirement, (4) creating a durable weather resistant coating utilizing the previously mentioned materials, such as the silicas and ceramics to reduce thermal degradation and copolymers that will adhere, flex with structural sifting and resist thermal degradation, and (5) achieving an aesthetically pleasing and smooth appearance by introducing the proper balance of preferred materials and procedures with pigmented oxides and additives known to the skill artisan of the particular art.

The coatings of selected preferred embodiments can use a fumed silica and/or a defoamer surfactant to decrease the air bubbles created in the premixing, transportation, movement or post mixing, thus resisting separation and blistering when dry. Additionally, the coating may comprise additives such as water, thickening agents to increase viscosity, biocides and pesticides for the shelf life and product longevity and optionally a plasticizer to toughen the coating and increase the elasticity. In some embodiments, these coating compositions can further comprise various conventional paint additives, such as dispersing aids, anti-settling aids, wetting aids, extenders, stabilizers, antifoams, texture-improving agents and/or antiflocculating agents. The amounts of such additives are routinely optimized by the ordinary skilled artisan so as to achieve desired properties in the coating, such as thickness, texture, handling, and fluidity.

Example 2

The preferred thermal coating formulation is referred to as OC Thermal Coating 2000 by trade name, and is prepared as follows. Percentages are measured by weight: Mix 12.5% $H_2O$ and 8% TiO and grid for 10 min. Add 35% Vinyl Acrylic Copolymer at low RPMs and mix for 5 min. Add 10.5% Perlite, (16 microns) slowly, increasing RPMs as needed. Mix until smooth. Add 34% Acrylic Latex Polymer (Elastomeric) Slowly; adjusting RPM's as needed. Mix for 30 min.

Example 3

Another preferred thermal coating formulation is referred to as OC Thermal Coating 27778 by trade name, and is prepared as follows. Percentages are measured by weight: Mix 10.5% $H_2O$ and 8% $TiO_2$ and 7% Yellow Oxide and Grind for 10 min. Add 31% Vinyl Acrylic Copolymer at low RPM's: mix for 5 min. Add 8% Perlite, (16 microns) slowly; increasing RPM's as needed: Mix until smooth. Add 5.5% Ceramic Micro Spheres slowly and mix for 10 min. Add 30% Acrylic Latex Polymer (Elastomeric) slowly, adjusting RPM's as needed: Mix for 30 min. Any color oxide or variant can be used in the formulation.

All embodiments of the OC Thermal Coatings can vary in percentages and selections of both emulsions and solids based on the need for the application. For example, a high volume of $TiO_2$ in the presence of perlite and/or fumed silica with microspheres and suspended in one or more of the preferred high performance emulsions/binders with the solid content of combined materials as low as 15% and as high as 90% will produce a coating that will reduce radiant conduction. $TiO_2$ has a high resistance to radiant conduction as well as wave reflective properties; when in the presence of amorphous silica, the combined physical properties of thermal resistance and conduction/diffraction are enhanced.

The following is an example of such a coating: the $TiO_2$ is increased to 35%, the perlite is increased to 30%, ceramic spheres are decreased to 0 to 3%, water is decreased to 5% and the remaining liquids are reduced to 27 to 30%. This produces a thick (up to 65 mils+thick) and high performance version of the OC Thermal Coatings, while sacrificing the esthetic appeal and cost.

An example of the emulsion replacement or variation of the emulsions in the OC Thermal Coatings is the styrene/butadiene polymer latex and/or the fluoroethylenealkylvinylether being introduced or used to completely replace the other polymers to achieve a harder finish while sacrificing some of its adhesive and rheological properties. The increased amount of the vinyl acrylic copolymer and/or the preferred elastomeric copolymer increases the rheological properties while losing some of its hardness.

In another embodiment, the introduction of microspheres and/or high percentages of $TiO_2$ in the presence of one or more of the amorphous silicas may offset production cost while maintaining an acceptable thermal coating. While the combination of all of the aforementioned materials may vary in percentages and in high volumes can produce a superior diffractive, non conductive, and thermal barrier.

Example 4

Water Based Coating or Paint with Thermal Blocking, (Diffractive) and Reflective Properties Exterior and/or interior coating having a durable finish with thermal blocking properties and enhanced reflective properties comprised of processed, expanded or finely milled and/or pyrogenic silicas and sometimes accompanied by micro spheres in combination of but not limited to, one, two or more component water based and/or polymer/copolymer latex binders are provided. Other emulsions include but are not limited to, for enhancement or used as a replacement would be elastomeric and/or a water born fluoropolymer emulsions and/or a styrene/butadiene. The combined properties of these elements create a coating similar to paint with a high level of thermatic resistance which reduces the composition break-down from natural elements and extreme temperature fluctuations, resistance to thermal conductivity and enhances the reflectivity which with all these properties combined reduces the structures internal load for environmental control systems and reducing energy cost thus conserving energy.

The preferred embodiments provide compositions and methods of use for reducing energy consumption of a structural body by coating one or more external, interior surfaces, and/or the roof of a structure with a thermal blocking coating. Coating compositions presented herein contain at least one thermal blocking or otherwise referred to as diffractive materials included but not limited to expanded and/or finely milled and/or pyrogenic silicas and sometimes accompanied by micro spheres, suspended in the preferred emulsions and are applied to walls, ceilings and roofs of a building's interior and/or exterior surfaces. Application of the present coating or paint compositions to structural surfaces provide for lower absorption of solar energy through the coated surface. This, in turn, results in lower surface temperatures and lower thermal conduction through the coated architectural surfaces. Thus, the interior environment of the structure can be more efficiently controlled and consequently, less energy is consumed to regulate the interior of said structure. Even architectural surfaces with no or sparse amounts of insulation coated with this coating or paint, will exhibit greater reductions in energy requirements. The physical properties that define the preferred embodiments ability to be thermally non-conductive and possess a wave diffraction characteristic; contribute to its ability to resist and/or retard the degradation and/or thermal combustion of said embodiment, thus designating it as a highly fire retard material.

A coating of preferred embodiments comprises from 1% to 85% solids by weight. The preferred coatings can be applied by one or two coats or as many times necessary so as to achieve sufficient coating of structural surface. For example, the preferred coating may be applied at from about 8 mils to about 35 mils wet film thickness, which is equivalent to from about 5 to about 22 dry mils film thickness.

The preferred coating compositions presented herein may be applied to interior or exterior structural surfaces after coating with primers. For instance, structural surfaces may be painted with a primer before application of the preferred coating compositions. This product is ready to use where uncured cementitious surfaces are common, or where excessive amounts of alkali are present in the substrate. Primer is also for use on wood or approved metal surfaces. Desirable results are obtained, for example, when the primer is applied with an airless sprayer, and back rolled for desired finish.

The preferred coating application rate is approximately 15 to 68 square feet per gallon on heavy laced stucco; approximately 22 to 80 square feet per gallon on lighter textures, and 35 to 80 square feet on smooth surfaces (26 to 35 mils wet, 18 to 22 mils dry film thickness) via brush, spray or roller. Coverage will depend on surface porosity, and thinning is not recommended.

Example 5

A coating with light colorant of preferred embodiments (Lt. Beige, known as OC Thermal Coating TC27778 or TC27778 by trade name) is prepared as a vinyl acrylic elastomeric coating having approximately 49% solids by weight. The perlite, (DicaLite 416) is approximately 8% by weight and the microspheres, (Extendospheres™ SL W-150) are approximately 9% by weight. The preferred coating contains 0% organic solvents, and pigment is approximately 15% by weight (pigments include titanium dioxide and yellow oxides). The viscosity, (KU, ASTM D4387) of the preferred coating is 121 and, (ICI, ASTM D4287) is 2.2. The weight is approximately 9.5.0 pounds per gallon.

Examples of performance of selected coatings of preferred embodiments, (otherwise known as OC Thermal Coating 27778 or TC27778) are as follows; 3% loss of viscosity after two weeks a 120° F., contrast ratio @ 3 mils, ASTM D2805=0.945, reflectance=82.3 and @ 6 mils, ASTM D2805=0.990, reflectance=82.3. The adhesion test to gloss alkyd, aluminum, Hardie Plank, stucco and acrylic chalk, ASTM 3359, one week were 5B, except for Hardie Plank @ 3B and Stucco @4B. Low temperature film formation (40° F.) ASTM D7306 @ 6 mils; sealed and unsealed pass. The leveling/general appearance, ASTM D4062=7 and sag resistance, ASTM D44400=16 mils.

Other coatings of the preferred embodiments perform similar to, the same as or better than the performance of the OC Thermal Coating TC2000 formulation as described above.

Percentages and selections of both emulsions and solids can be varied based on the need for the application. For example, the introduction of a fluoropolymer to the vinyl acrylic copolymer and/or in combination of the elastomeric enhances the ability to resist thermal absorption and conductivity, strengthen the rheological properties, and prolong the life of the coating. The same is true with the styrene/butadiene polymer latex.

The variation of percentages of the amorphous silicas such as the perlite and/or the fumed silica can differ depending upon the desired performance and appearance. For example, while attempting to maintain the thermal blocking/diffraction capabilities and/or reflective potential, the fumed silica can dominate the perlite in volume to achieve a smooth finish, while the perlite may dominate or replace the fumed silica completely to achieve an affordable, high performance coating yet not as aesthetically pleasing in appearance.

The introduction of microspheres and/or high percentages $TiO_2$ in the presence of one of more of the amorphous silicas may offset production cost while maintaining an acceptable energy efficient coating. While the combination of all of the aforementioned materials at varying percentages and in high volumes can produce a superior isolative, diffractive, non conductive, and reflective coating.

For example, a high volume of $TiO_2$ in the presence of perlite and/or fumed silica with the option of, combining microspheres and suspended in one or more of the preferred high performance emulsions/binders such as the vinyl acrylic copolymer, the fluoropolymer, elastomeric; with the solid content of combined materials as low as 1% and as high as 95.5% will produce a coating that will reduce radiant conduction. $TiO_2$ has a high resistance to radiant conduction as well as reflective properties; when in the presence of amorphous silica, the combined physical properties of resistance and diffraction are enhanced.

Example 6

Fire Retardant Composition

The fire retardant compositions of preferred embodiments comprise a three component mixture. The mixture includes styrene/butadiene (for example, a liquid latex), a fluoropolymer binder, and a mix of low heat conductivity silicas. The fire-resistant compositions can be employed as coatings themselves, or can be formulated with additional components to yield, e.g., latex paints, stuccos, textured coatings, and the like. The fire retardant compositions are particularly preferred for use in conjunction with other coatings, e.g., base coats or clear coats.

The fluoropolymer binder component of the fire retardant compositions imparts flexibility and ductility to the composition and serves to inhibit checking and cracking of the when applied to flexible surfaces such as pipes, tubing, cabling, and the like, and improves the water-resistance of the coating. The fire retardant compositions can reduce fire damage when employed, e.g., on interior surfaces in a building, exterior vertical walls, roofs, and other exterior surfaces of a building or structure. When used as wall coatings, the fire retardant compositions inhibit damage to the wall when exposed to fire, and can limit damage to the exterior surface of the coated material.

Advantageously, the fire retardant compositions are provided in a form of an aqueous solution, dispersion or suspension which can be applied to a surface such as a wall or a ceiling or a roof or a floor by methods such as brushing, spraying, rolling, and the like. Preferably, the fire retardant compositions can be applied directly to a surface to provide a non-flammable or substantially non-flammable barrier. In certain embodiments, the fire retardant compositions exhibit anti-mold properties, smoke barrier properties and/or thermal insulating properties as well. Homogeneous dispersions are particularly preferred.

The fire retardant compositions of the preferred embodiments provide effective non-flammable or substantially non-flammable and smoke-free or substantially smoke-free barrier coatings when employed alone on a surface (e.g., in the absence of an undercoating or overcoating). For example, a variety of flammable building materials may be converted to Class A or Class B building material by application of a fire retardant composition of the preferred embodiments. In various embodiments, coatings containing the fire retardant compositions pass the "Surface Burning Characteristics of Building Materials" standard, ASTM E84-04 with a flame spread index of 0 and/or a smoke index of 0 and achieve a Class A or B rating, preferably a Class A rating. In some embodiments, coatings containing the fire retardant compositions also pass Fed. Std. 141B, Method 6221 for flexibility with no cracking or checking.

The Latex Liquid

Latex is a name collectively given to a group of similar preparations consisting of stable dispersions of polymeric particles in a liquid matrix (usually water), e.g., a colloidal suspension, and embraces without limitation natural latex, neoprene latex, nitrile latex, acrylic latex, vinyl acrylic latex, styrene acrylic latex, styrene butadiene latex, and the like. Exemplary polymers for these latex compositions include, but are not limited to, methyl methacrylate, styrene, methacrylic acid 2-hydroxyethyl acrylate polymer (CAS #70677-00-8), acrylic acid, methyl methacrylate, styrene, hydroxyethyl acrylate, butyl acrylate polymer (CAS #7732-38-6), butyl acrylate, methyl methacrylate, hydroxyethyl acrylate polymer (CAS #25951-38-6), butyl acrylate, 2-ethylhexyl acrylate, methyl methacrylate, acrylic acid polymer (CAS #42398-14-1), styrene, butylacrylate polymer (CAS #25767-47-9), butyl acrylate, 2-ethylhexyl acrylate, methacrylic acid polymer C (CAS #31071-53-1), acrylic polymers, and carboxylated styrene butadiene polymers. Combinations of more than one latex binder are also contemplated to be useful in the practice of the embodiment.

Latexes can be natural or synthetic. Synthetic latexes are usually produced by emulsion polymerization using a variety of initiators, surfactants and monomers. The latex liquids employed in the preferred embodiments are preferably white in color, although other colors can also be advantageously employed. Aqueous emulsions are particularly preferred; however, any suitable liquid matrix can be employed (e.g., alcohols, other solvents, and mixtures thereof with water).

A particularly preferred latex liquid for use in the fire retardant compositions of preferred embodiments is marketed under the product name Dependable White Latex Liquid by Dependable Chemical Co. (Rocky River, Ohio). The composition comprises 18-24% styrene/butadiene, 65-80% water, with the remainder including biocides and other preservatives and additives. While Dependable White Latex Liquid is particularly preferred, any other latex liquid possessing similar properties or suitable for similar uses can be employed in the fire retardant compositions of preferred embodiments.

The Fluoropolymer Binder

Particularly preferred fluoropolymer binders include Lumiflon FE-4400 fluoroethylene-alkylvinylether polymer. The fluoropolymer binder is preferably in the form of an aqueous emulsion. While fluoroethylene-alkylvinylether polymer is particularly preferred, any other fluoropolymer possessing similar properties or suitable for similar uses can be employed in the fire retardant compositions of preferred embodiments.

The fluoropolymer emulsion imparts superior durability and waterproof properties to the fire resistant composition.

The Low Heat Conductivity Silicas

Low heat conductivity silicas (also referred to as silicon dioxides) and/or silicates are employed in the fire retardant compositions of preferred embodiments. Preferred forms of silica are particulate forms possessing high surface areas. Pyrogenic silicas (also referred to as fumed silica) are very fine particulate forms of silicon dioxide prepared by burning silicon tetrachloride in an oxygen-rich hydrogen flame. Amorphous silica, (also referred to as silica gel) is produced by the acidification of solutions of sodium silicate to produce a gelatinous precipitate that is then washed and dehydrated to produce colorless microporous silica. Sodium silicate (also referred to as water glass) is a white solid that is soluble in water, producing an alkaline solution. Various forms of sodium silicates include sodium orthosilicate, $Na_4SiO_4$; sodium metasilicate, $Na_2SiO_3$; sodium polysilicate, $(Na_2SiO_3)n$; sodium pyrosilicate, $Na_6Si_2O_7$, and others.

In fire resistant compositions of preferred embodiments a mixture of sodium silicate is preferably employed. A preferred sodium silicate solution is marketed under the tradename N®Clear by PQ Corporation (Valley Forge, Pa.) is employed. N®Clear sodium silicate solution is in the form of a syrupy liquid having a weight ratio of $SiO_2$ to $Na_2O$ of 3.22, 8.9% $Na_2O$, 8.7%% $SiO_2$, a density at 20° C. of 180 $g/cm^3$, and a pH of 11.3.

In another embodiment, a fumed silica may be used. A preferred fumed silica is marketed under the tradename CAB-O-SIL® M-5 by Cabot Corp. (Alpharetta, Ga.). It is a synthetic, amorphous, colloidal silicon dioxide that is white, light, fluffy powder. Typical properties include a B.E.T. surface area of 200 $m^2/g$, a pH (4% aqueous slurry) of 3.7 to 4.3; 325 mesh residue (44 microns) of 0.02% max., a tamped density of 50 g/l, a loss on heating of less than 1.5%, a specific gravity of 2.2 $g/cm^3$, a refractive index of 1.46, an assay (% $SiO_2$) of greater than 99.8%, oil adsorption of ~350 g/100 g oil, and an average particle (aggregate) length of 0.2 to 0.3 microns. The sodium silicate liquid increases the decomposition temperature of the white latex liquid.

A single type of silicate can be employed, or alternatively a mixture of two, three, four, five, six, or more silicas (e.g., of different types, grades, particle sizes, properties, etc.) can be employed, depending upon the particular application. When fumed silica is employed as the silicate, it is preferably added to the latex liquid before other components of the fire retardant composition so as to avoid the possibility of undesirable reaction with other components of the mixture; however, the fumed silica may be added at other times in the mixing process in embodiments where such reactions do not occur or have no significant adverse impact on the performance of the composition. Sodium silicates typically expand when heated (exhibit intumescent properties); however, when modified by the fluoropolymer binder (e.g., Lumiflon FE-4400), the silicate does not expand as in other conventional intumescent coatings, thereby imparting superior fire resistant properties Coating Formulations While the three component fire resistant compositions of preferred embodiments can be suitable for use as coatings in certain applications, in other applications it can be desirable to provide coating formulations containing materials in addition to the liquid latex, fluoropolymer binder, and silica.

Intumescent coating materials can optionally be added to the fire resistant compositions. Examples of intumescent coating materials are described, e.g., in U.S. Pat. No. 5,759,692; U.S. Pat. No. 5,603,990; U.S. Pat. No. 5,225,464; U.S. Pat. No. 4,144,385; U.S. Pat. No. 4,065,394; U.S. Pat. No. 3,955,987; U.S. Pat. No. 3,448,075; U.S. Pat. No. 3,442,046; U.S. Pat. No. 3,021,293; U.S. Pat. No. 2,755,260; U.S. Pat. No. 2,684,953; U.S. Pat. No. 2,600,455; U.S. Pat. No. 2,566,964; U.S. Pat. No. 2,523,626; U.S. Pat. No. 2,452,054; and U.S. Pat. No. 2,452,055, the disclosures of which are hereby incorporated by reference herein in their entirety.

A polymeric binder in addition to the fluoropolymer binder can also be added to impart flexibility and ductility to the resulting coating, thereby increasing the range of surfaces to which the coating can be applied. Thermoplastic polymers and thermosetting polymers are suitable for use, e.g., polyvinyl alcohol, polyvinylidene fluoride, polyethylene oxide, polyethylene, polypropylene, polytetrafluoroethylene, polyacrylates, polyvinyl chloride, urethanes, polyesters, natural polymers such as starch, and the like. The fire resistant and smoke resistant properties of the coating can be enhanced by employing a polymeric binder which is itself not highly flammable, only slightly flammable, or preferably non-flammable. The polymeric binder can be provided in any suitable for, e.g., as a water-dispersible polymer, and can include latex binders in addition to the latex liquid. The polymeric binder can be advantageously provided in a form of an aqueous colloidal dispersion of polymer particles having particles diameters of from about 0.01 microns or less to about 10 microns or more, more preferably from about 0.05 microns to about 1 micron are especially suitable.

The amount and type of polymeric binder is preferably selected based upon the desired degree of flexibility to be imparted to the coating. Many polymeric binders are, by nature, soft resins. Other binders may be harder and thus not capable of producing highly flexible coatings; accordingly, it can be desirable in certain embodiments to add a plasticizer to the coating, e.g., phthalates, such as dioctyl phthalate, diisononyl phthalate, diisodecyl phthalate, di(2-ethylhexyl) phthalate; vegetable oil plasticizers, including without limitation epoxidized soybean oil and esters derived from various vegetable oils; adipates such as di-(2-ethylhexyl)adipate and diisononyl adipate, plasticizers derived from adipic acid, and 2-ethyl hexyl diphenyl phosphate.

Pigments, as discussed below, can advantageously be employed, as can various liquid vehicles. Additionally, other additives, including emulsifiers, defoamers, biocides, and other such materials as known in the coating art can also be employed. The compositions may be in any form that allows for effective application, such as liquids, gels, pastes, and foams, when employed as coatings.

Paints

The fire resistant compositions of preferred embodiments are advantageously employed as components of latex paints. Such latex paints typically have substantially lower contents of petroleum-derived materials than conventional latex paints, and can be formulated to pass the ASTM E84 Tunnel Test with a flame spread index of 0 and/or a smoke index or 0.

The paint can be formulated into any desired color through the addition of pigments. The flame resistant compositions are typically white or off-white in color, and can be rendered other colors (e.g., black, blue, green, yellow, red or any combination thereof) through the use of pigments. Typically, the latex paints can comprise one or more opacifying or "hiding" pigments, e.g., rutile and anatase titanium dioxides, lithopone, zinc sulfide, lead titanate, antimony oxide, zirconium oxide, titanium calcium, white lead, titanium barium, zinc oxide, leaded zinc oxide, and the like. Particular mention may be made of titanium dioxide as an opacifying pigment. The opacifying pigment typically comprises from about 1% to about 20% by weight of the dry paint. In various embodiments, the opacifying pigment can have a weight average particle size between about 0.2 to 0.4 microns; however, smaller or larger particles can also be employed. Colored pigments can be either organic or inorganic. Suitable colored pigments include, without limitation, ferrite yellow oxide, ferric oxide, brown or tan oxide of iron, raw sienna, raw and burnt umber, chromium oxide green, ultramarine blue, carbon black, lampblack, toluidine red, cadmium reds and yellows, duratone red, chrome yellow, and the like. When present, colored pigments typically comprise from about 1% to about 10% by weight of the dry paint.

Extender or inert pigments, e.g., calcium carbonate, talc, clay and the like, can be added to adjust the thickness, gloss and durability of the paint. Gloss, semi-gloss, satin, eggshell, or flat paints, as defined by ASTM Test Method D523 "Standard Test Method for Specular Gloss," depending on the amount of total pigment employed, can be formulated.

Liquids, e.g., volatile vehicles, are typically included in the paint. Suitable liquids include glycols to keep the paint liquid and uniform prior to drying. Thickeners can be added to enhance the rheological properties of the paint. Suitable thickeners include, without limitation, hydroxyethylcellulose (HEC), hydrophobically modified HEC (HMHEC), hydrophobically modified alkali-soluble emulsions (HASEs), and nonionic synthetic associative thickeners (NSATs). Non-cellulosic thickeners, such as polyacrylic acids and activated attapulgite, are also contemplated to be suitable. Other conventional latex paint additives can also be added, including but not limited to freeze-thaw stabilizers, coalescing agents, bactericides and fungicides, defoamers, and pigment dispersants.

The latex paints can be prepared according to conventional practice. Typically, a "grind" can be prepared by vigorous mixing of the pigment with other components to break up agglomerated pigments and provide a homogenous viscous dispersion. Optionally, hydrated metal silicate clay can be added, as well as other components, commonly referred to in the art as the "letdown," can be added to the grind and mixed to form the final paint formulation. The polymeric binder may be partitioned between the grind and the letdown, but can be preferably added with the letdown.

Typically, a prepared three component fire retardant composition is added to a conventional latex paint. Alternatively, a latex paint can be formulated by combining various components in various orders, the components including the individual components making up the three component fire retardant composition.

OC Thermal Mix

The fire resistant compositions of preferred embodiments can be formulated into a variety of formulations. For example, by using the Perlite 416 versus the Perlite 476, the scalability, permeability and moldability of the mixture changes. The OC Thermal Mix, when included with a cementitious material is a cement that can provide superior insulation and heat resistant thermal protection. The OC Thermal Mix provides uniform thermal protection from both heat and cold. Such mixtures are further described below.

OC Thermal Coating 2000

OC Thermal Coating 2000 is a low temperature acrylic latex based coating that can be employed to insulate buildings, homes, pipes, boilers and any other area where heat build-up or containment can be a problem. The coating protects against ultraviolet rays, wind, water, heat and cold, which results in a longer life for the surface to which it can be applied, and does not crack, peel, or fade when applied properly. A 10 mil thickness of the coating can result in an R rating of 20 or greater on most surfaces. It can be applied to metal roofs, built-up gravel roofs, concrete blocks, piping, and on boilers. The product can be suitable for commercial buildings, homes, and any other areas where heat buildup or containment can be a problem. When used on metal roofs, it can keep heat expansion and contraction to a minimum, eliminating many causes of water damage and other costly maintenance problems. It provides fire retardation, smoke retardation, mold retardation, and is non-toxic and an insulating material. The composition is not water soluble.

Other Compositions

Stucco elastomeric coating can be prepared for application to stucco surfaces. It is a protective coating that protects against ultra-violet rays, mildew, wind, and water. It has the ability to "breathe", which relieves any condensation buildup from within the walls and/or the stucco itself. It also does not retain heat or cold, therefore the aging process can be greatly reduced. The coating can easily obtain a class "A" rating from a U.L. rated flame spread test, and can be formulated in a wide range of colors.

In other embodiments, the fire retardant compositions can be fabricated into fire bricks, insulated concrete wall board, high temperature concrete, lightweight insulated concrete blocks, lightweight insulated concrete roofing tiles, lightweight ornamental concrete, lightweight concrete stepping stones, insulated elastomeric wrap, insulated PVC pipe, insulated fiberglass/gel coat, and insulated stucco.

Methods of Application

The heat resistant, non-conductive compositions and coatings can advantageously be molded into bricks or other forms. They can also be used or molded as counter tops or applied with other compositions to make insulating tape forms and the like.

The fire resistant compositions and coatings, when in liquid form, can advantageously be applied by brush, roller, or commercial grade airless sprayer to a surface to impart fire resistance. Coverage rates can be selected depending upon surface porosity and texture. Preferably, a uniform film thickness is applied over the entire coated surface.

Generally, all surfaces are to be sound, clean, and dry prior to application of the fire resistant compositions and coatings. If the surface is not clean, all loose, flaking, or oxidized paint should be removed from the surface by sand blasting, water blasting, wire brushing, or scraping. Large cracks, holds and voids can be filled in with patching compounds, preferably to match the texture of the existing surface.

Drying to the touch occurs in approximately two hours after application, but can vary depending upon humidity and temperature. For drying to hardness, approximately 24 hours of curing time is desired. Circulating air and/or heat can be applied to speed the curing process.

Treated Surfaces

The fire resistant compositions and coatings containing same can be advantageously employed with various construction materials for use in, e.g., home, commercial, industrial, automotive, aeronautic, and marine applications. These include materials containing wood, wood fiber composites, wood veneer, grass thatch, bamboo, paper, open or closed cell foam, and natural or synthetic fibers. The types of materials include lumber, flooring, wallboard, roofing shingles, siding, insulation, and paper-backed construction products.

Preferred objects also include fire barrier materials to protect property and control the spread of wildfires. The fire barrier material may be composed of any material capable of absorbing or retaining the fire retardant composition. The fire retardant composition can be applied before or after the fire barrier material has been placed in its protective location.

The coatings can be applied to any suitable surface, including, without limitation, plastic, rubber, metal, composite materials, wood, synthetic fibers, and cellulosics such as, for example cardboard. Flexible and rigid surfaces can be treated, depending upon the specifics of the formulation. Exemplary surfaces include exterior walls, interior walls, roofs, floors, doors, ceilings, window trim, pipes, tubes, cables, cords, ropes, wires, hoses, weld blankets, automotive parts including for example, shifter boots, "soft tops," fire walls, interior paneling, flexible panels, mats, molded plastic articles and the like.

Preferably, the coatings are applied directly to a surface to provide a substantially non-flammable, preferably non-flammable, and substantially smoke-free, preferably smoke free, barrier. However, the advantages of the present embodiment may be most fully realized when the coatings are employed in conjunction with one or more other coating materials.

The coatings can be applied over one or more under-coatings, including for example, intumescent coatings, primer coats, and the like. Top coats, e.g., clear coats or coats of conventional paint (e.g., latex, oil-based, and the like) can also be employed. In a particularly preferred embodiment, a coating system is employed including the fire resistant composition applied over one or more under-coatings, wherein at least one of the under-coatings is an intumescent composition. Suitable intumescent compositions are described in U.S. Pat. No. 5,035,951, the contents of which are hereby incorporated by reference herein.

Example 7

A fire retardant composition was prepared containing white latex liquid (Dependable White Latex Liquid); sodium silicate (N®Clear), and fluoropolymer emulsion (Lumiflon FE-4400). Additional components were included in the formulation to yield a fire resistant coating suitable for interior and exterior use. The additional components included a titanium dioxide pigment and a mixture of ceramic hollow beads and perlite. The titanium dioxide is marketed under the tradename KEMIRA RD 3 by Kemira Pigments OY (Pori, Finland). It is an alumina-zirconia surface treated rutile titanium dioxide pigment having a pH of 7-8 and a mean crystal size of approx. 220 nm. The ceramic hollow beads are marketed under the tradename EXTENDOSPHERES® SL-150 by Sphere One, Inc. (Chattanooga, Tenn.). They are in the form of a free-flowing cream colored powder having a particle size of 10-150 microns, a mean particle size of 70 microns, a bulk density of 21.5 lbs/ft$^3$, a density of less than 0.62±0.03 g/cm$^3$, a deformation temperature of >1500° C., a compressive strength of 10% at 3000 psi, and a hardness (Moh's scale) of 5. They comprise silica ($SiO_2$) 59.0%; alumina ($Al_2O_3$) 38.5%, iron oxides (as $Fe_2O_3$) 0.5%; and titanium dioxide (TiO2) 1.7%. The perlite was 476 Nashville Filter Aid (NFA) marketed by Dicaperl, 225 City Avenue, Suite 14 Bala Cynwyd, Pa. 19004.

The fire resistant coating was prepared as follows. 1176 grams of white latex liquid (Dependable White Latex Liquid) is added to the mixing container. 600 grams of titanium dioxide was then added to the mixing at blender revolutions per minute (rpm) just below turbulence. 1 gram of Cab-O-Sil® M5 fumed silica was added and the mixture was mixed for 10 minutes. 288 grams of fluoropolymer emulsion was added and mixed for an additional 5 minutes at the same mixing rate. 1668 grams of sodium silicate was added at a higher mixing rate and mixed for 5 minutes.

A mixture of 800 grams ceramic hollow beads and 1000 grams of perlite was prepared, and 600 grams of the mixture was added to the previously combined components. The rate of mixing was increased after no dry particles were visible. Mixing was continued for 15 minutes, and then stopped slowly over one minute to yield a fire resistant coating.

A test of the fire resistant coating was conducted using a wood two-by four-frame having two sides 8' tall and 4' wide. The two sides met at a 90-degree corner, simulating a normal house corner wall. A full ceiling was not installed across the top of the frame. A metal roof piece tied the two wall sections together, but left a 1' by 1' opening at the corner of the frame. Two 8' by 4' plywood boards were attached to the frame. One plywood board was coated with a single coat of the fire resistant coating. The other plywood board was not coated. The coated plywood board was ⅜" thick and the uncoated plywood board was ½" thick. The fire was generated using wood planks. The planks were broken into approximately 2-foot long segments. Two-by-fours were employed to provide spacing between three or four layers of planks. Straw was placed in between the spaces. The wood planks were placed approximately 4" inches from each wall and built to a height of approximately 1.5'. The fire was started without the use of accelerants, and ran for approximately 10 minutes.

Examination of the coated board and the uncoated board showed the coated board was not damaged on the backside by fire. The uncoated board, although thicker than the coated board, had breakthrough from the front side to the back side. The uncoated board was severely damaged when compared to the front side of the coated board.

Example 8

Fire Retardant Formulations

In the preferred method of creating a fire resistant coating, the composition takes into consideration five requirements:

First, its refractory properties which are established through the utilization of a known fire resistant material, $TiO_2$ and other dry oxide pigments. These materials are capable of withstanding extremely high temperatures. Second, creating an insulating barrier to retard the penetration of heat through the coating; this is achieved by using fumed silica and/or perlite and/or vermiculite and/or other materials maintaining similar properties. Other considerations for insulting values include intumescent materials such as, but not limited to sodium silicates which expand under extreme temperatures. Third, creating a disruptive layer that will diffract any heat introduced to the coating and reduce the remittance back into the area of the source thus reducing the thermal blanketing affect. Fourth, the combined ability of the materials to maintain the coatings integrity under extreme temperatures. Using the aforementioned materials in combination with the preferred emulsions; such as the Vinyl Acrylic Copolymer, the Styrene/Butadiene Polymer, the fluoroethylenealkylvinylether, and/or other similar emulsions containing similar physical properties, can be balanced with the proper level of the preferred solids to achieve this requirement. And fifth, resisting the tendency of most coatings and paints to release a quick and short burst of fuel in the presence of a fire. This phenomenon is referred to as a flashover point and it is instrumental in producing an intense and explosive fire. It is produced by a minimal presence of materials with low combustion points.

The coatings of preferred embodiments optionally use a defoamer surfactant to decrease the air bubbles created in the premixing, transportation, movement or post mixing, thus resisting separation and blistering when dry. Additionally, the coating may comprise additives such as water, thickening agents to increase viscosity, biocides and pesticides for the shelf life and product longevity and optionally a plasticizer to toughen the coating and increase the elasticity. Coating compositions of the preferred embodiments can further comprise various conventional paint additives, such as dispersing aids, anti-settling aids, wetting aids, extenders, stabilizers, antifoams, texture-improving agents and/or antiflocculating agents. The amounts of such additives are routinely optimized by the ordinary skilled artisan so as to achieve desired properties in the coating, such as thickness, texture, handling, and fluidity.

Example 9

The following example described the preferred fire retardant formulation (termed OCF 9B). This preferred embodiment achieves all five requirements as outlined above. An addition of the intumescing silicate may act as final defensive barrier once the temperatures reach a critical point where the coating can no longer maintain a resistance to thermal induction. The coating is able to maintain its integrity for prolonged periods in the presences of extreme temperatures, (5 minutes or more at 1200° F.+) before thermal degradation is initiated. Once degradation is imminent, carbonization begins and the coating will expand up to 300% creating a final insulating barrier made up of the carbonized material. This carbonized matrix is highly resistant to combustion and will continue to insulate and protect the substructure thus diminishing the ability of a fire to obtain additional fuel. In addition, the fumed silica, perlite and ceramic spheres are equally dispersed throughout the carbonized matrix enhancing the insulating properties and drastically reducing the possibility of thermal acceleration/thermal blanketing.

Percentages are measured by weight: H2O 4.5% Fumed Silica 0.585% TiO2 12.265% Grid for 10 min. Styrene/Butadiene Polymer Latex—23.99% Add at low RPM's: mix for 5 min. Sodium Silicate, (liquid 41A) 34.85%. Add slowly at low RPM's: Mix for 10 min. Perlite, (16 microns) 10.53% Add slowly; increase RPM's as needed: Mix until smooth. Ceramic Micro Spheres 8.39% Add slowly: Mix for 10 min. Fluoroethylenealkylvinylether Polymer, (water-born) 4.89% Add slowly; adjust RPM's as needed: Mix for 20 min.

Example 10

The following example describes the preferred primer and/or fire retardant coating (termed OCF 3000) and achieves all five desirable attributes; however, the formulation's primary attribute is its ability to maintain its integrity under temperatures as high as 3500° F. while initial flash over is nonexistent. This is achieved by obtaining a high solid content of TiO2 and/or other oxide pigments and expanded volcanic glass (milled perlite is preferred). The coating is able to maintain its integrity for prolonged periods (10 to 15 minutes), in the presences of extreme temperatures, (up to 3500° F.+) before thermal degradation is initiated. Once degradation begins, its progression is slowed by the presence of carbonized materials, silicates and ceramic spheres. Flashover will not occur due to the materials in the coating and the substructure will be protected until the carbonized matrix fails to maintain a solid bond to the substrate. Flashover is avoided by the level of solids reducing thermal conduction to induce a slow carbonization of the polymers before they reach a flash point. Because carbonization is reached before the flashpoint of the polymers there is no fuel provided to create a flashover.

Percentages are measured by weight: $H_2O$ 8% Fumed Silica 0.585% $TiO_2$ 28.5% Grid for 10 min. Vinyl Acrylic Copolymer—33.03% Add at low RPM's: mix for 5 min. Perlite, (16 microns) 18% Add Slowly; increase RPM's as needed: Mix until smooth. Ceramic Micro Spheres 8.39%. Add slowly: Mix for 10 min. Fluoroethylenealkylvinylether Polymer, (water-born) 3.5% Add slowly; adjust RPM's as needed: Mix for 20 min after all components are added. All embodiments of the OCF 3000 may vary in percentages and selections of both emulsions and solids based on the need for the application.

For example, a high volume of $TiO_2$ in the presence of perlite and/or fumed silica with microspheres and suspended in one or more of the preferred high performance emulsions/binders and liquid silica; with the solid content of combined materials as low as 15% and as high as 90% will produce a coating that will reduce radiant conduction. $TiO_2$ has a high resistance to radiant conduction as well as wave reflective properties; when in the presence of amorphous silica, the combined physical properties of burn resistance and conduction/diffraction are enhanced.

The following is an example of these possibilities: The Fumed silica is removed from the formula and the $TiO_2$ is increased to 35%, the Perlite is increased to 30%, ceramic spheres are decreased to 0 to 3%, water is decreased to 5% and the remaining liquids are reduced to 27 to 30%. This will produce a thick (up to 65 mils+thick), and high performance version of the OCF 300, while sacrificing the atheistic appeal and cost.

An example of the emulsion replacement or variation of the OCF 300 might be the Styrene/Butadiene Polymer Latex being introduced to the Fluoroethylenealkylvinylether or used to completely replace the Fluoroethylenealkylvinylether to achieve a harder finish while sacrificing some of its durability and rheological properties. The increased presence of the Vinyl Acrylic Copolymer will increase the rheological properties while losing some of its hardness and durability.

For economical purposes, the introduction of microspheres and/or high percentages $TiO_2$ in the presence of one or more of the amorphous silicas may offset production cost while maintaining an acceptable flame retardant coating. While the combination of all of the aforementioned materials may vary in percentages and in high volumes can produce a superior diffractive, non conductive, and fire resistant coating.

Example 11

Interior/Exterior Fire Retardant Coating (IEFR 1800)

The preferred embodiments can utilize a known fire retardant which has intumescent properties as well as a mixture of low heat conductivity silica materials to provide fire retardant properties. The fire retardant chemical has been modified to reduce the intumescent properties such as expansion and charring without lost of its fire retarding capabilities. Coating compositions presented herein contain at least one thermal blocking (otherwise referred to as diffractive) materials including but not limited to expanded and/or finely milled silicas and/or pyrogenic silicas, which are accompanied by microspheres. These are suspended in the preferred emulsions and are applied to walls, ceilings and roofs of a building's interior and/or exterior surfaces or any other appropriate substrate. Fire coating compositions presented herein may be applied as many times as necessary so as to achieve sufficient coating of interior/exterior walls, ceilings, roofing and other structure materials.

The particularly preferred ingredients used in the preferred embodiments are as follows.

Vinyl Acrylic Copolymer Liquid: the particularly preferred vinyl acrylic copolymer for use in preferred embodiments is marketed under the product name PD-0124, Fulatex Polymer Products® produced by H.B. Fuller Company, (St. Paul, Minn.). While the PD-0124 Fulatex is particularly preferred, any other vinyl acrylic copolymer, acrylic polymer, acrylic copolymer, and vinyl copolymer or vinyl polymer possessing the similar properties or suitable for similar uses can be employed in the coatings. Any reference to Vinyl Acrylic Copolymer liquid will be referred by definition to the aforementioned description of this paragraph.

Latex Polymer: the particularly preferred latex polymer is commonly referred to as styrene/butadiene polymer latex. The composition comprises up to 65% styrene/butadiene. While the styrene/butadiene polymer latex is particularly preferred; any other latex liquid possessing the similar properties or suitable for similar uses can be employed in the coatings. Any reference to latex liquid will be referred by definition to the aforementioned description of this paragraph.

Fluoropolymer Binder: the particularly preferred fluoropolymer binder for use in preferred embodiments includes product name FE-4400 fluoroethylenealkylvinylether polymer. This polymer is particularly preferred in an aqueous emulsion. While FE-4400 fluoroethylenealkylvinylether polymer is particularly preferred, any other fluoropolymer emulsion possessing the similar properties or suitable for similar uses can be employed in the coatings.

Water Glass/Sodium Silicate: The particularly preferred sodium silicate solution is marketed under the trade name N®Clear by PQ Corporation, (Valley Forge, Pa.) is in the form of a syrupy liquid having a weight ratio of SiO2 to Na2O of 3.22, 8.9% Na2O, 8.7% SiO2, a density at 20° C. of g/cm³, and a pH of 11.3.

Amorphous Silica: The particularly preferred amorphous silica with thermally resistant and radiant wave diffraction properties; also referred to as silicon dioxides, is Perlite. The presence of silicon dioxides such as perlite, vermiculite and/or fumed silica create a matrix at a molecular level when suspended at the proper density in the preferred solutions which will form a low heat conductive and wave diffractive barrier against radiant heat waves which will in turn be more prone to be reemitted in the direction in which it came rather than be absorbed into the material. When the preferred material is accompanied by materials with reflective properties and/or micro spheres this ability is enhanced so that the reemitted radiant wave is substantially diminished. The particularly preferred silicas are as follows:

Perlite: The particularly preferred perlite is sourced from SOCORRO ORE and has the generic name of volcanic glass (CAS#93763-70-30), the chemical name is amorphous siliceous mineral-silicate and the formula is Sodium-potassium-aluminum-silicate of variable composition. This material is expanded at temperatures of 850° F. or greater and is than milled to the desired micro particle size. While this perlite is particularly preferred, any other perlite of varying particle size (expanded or milled), possessing the similar properties or suitable for similar uses can be employed in the coatings. Dicalite 416 and 475 are the particularly preferred perlites for use in preferred embodiments. It is marketed under the product name Dicalite. While Dicalite 416 and 475 (measured in microns), is particularly preferred for its fine particle size, (useful for smooth finished surfaces), any other perlite of varying particle size; expanded or milled, possessing the similar properties or suitable for similar uses can be employed in the coatings. The definition of any reference to perlite will be referred by to the aforementioned description of this paragraph.

Fumed Silica: Cab-O-Sil® M-5 is the particularly preferred for use in preferred embodiments. It is marketed under the product name Cab-O-Sil® M-5 produced by CABOT Corporation. While Cab-O-Sil® M-5 is particularly preferred, any other fumed silica of varying micron size, possessing the similar properties or suitable for similar uses can be employed in the coatings. The definition of any reference to fumed silica will be referred by to the aforementioned description of this paragraph.

Microspheres: Extendospheres™ are the particularly preferred SLW 150 microspheres for use in preferred embodiments. It is marketed under the product name Extendospheres™ and produced by Sphere One Inc. While Extendospheres™ are particularly preferred, any other microspheres of varying size, possessing the similar properties or suitable for similar uses can be employed in the coatings.

In one embodiment the composition of the coating includes a latex polymer. The particularly preferred latex polymer is blended with $TiO_2$, microspheres, fumed silica, sodium silicate and perlite to create a flame resistant coating.

In another embodiment, the combination of a latex polymer blended with $TiO_2$, microspheres, fumed silica, perlite, sodium silicate and a water-based vinyl acrylic copolymer creates a durable flame resistant coating.

In yet another embodiment, the coating composition comprises a latex liquid, blended with $TiO_2$, microspheres, perlite and a fluoropolymer binder. These two emulsions in combination with the preferred sodium silicate create a tough, heat resistant, non-conductive fire retardant coating.

In yet another embodiment, the coating composition is made up of a three part emulsion comprising of a vinyl acrylic copolymer, a latex polymer. The two emulsions are blended with $TiO_2$, microspheres, fumed silica, perlite, sodium silicate and a water-born fluoropolymer emulsion to create a more durable fire retardant coating.

In other variations the need to lower remittance may not be necessary; any of the aforementioned compositions may have particular components removed (such as microspheres, sodium silicate and/or the fumed silica), to achieve an even higher performance fire retardant coating. In addition any or all of these components may vary in volume to achieve the appropriate performance requirement.

Advantageously, all of these embodiments are very resistant to thermal absorption and flame resistance. Additionally, the presence of the $TiO_2$ and/or any oxides/dioxides in combination with the perlite and/or fumed silica substantially increases the reflective properties. The combination of the strength of the vinyl copolymer and the fluoropolymer emulsion make for a tough and adaptable coating for any substrate and in a variety of extreme environments. The addition of the latex emulsion only increases the performance of all of these properties. Any one of these emulsions can be varied, replaced or combined to achieve the best results of the required application.

In an alternative embodiment, a polyurethane solution can accompany and/or replace any or all of the preferred liquid embodiments to increase the strength and/or hardness of the paint or coating. This is especially true in combination with the fluoropolymer emulsion and/or the vinyl copolymer.

In many of the abovementioned embodiments, the addition of microspheres can decrease the absorption of heat into the coating. Microspheres can reduce the strength, rheological properties and prolonged existence of most coatings; however, use of perlite or fumed silica with the micro-spheres can compensate.

When introducing the microspheres to the aforementioned matrices, the addition of toners or colorants can optionally be made. While the thermal absorption is increased once a non-white pigment is introduced, the presence of the microspheres substantially offset this negative by increasing the diffraction. Because of this factor the variations of the preferred coatings can be pigmented because of the introduction of micro-spheres or covered with a color variant of the preferred embodiments possessing the micro-spheres. This will allow the layering of various versions of the preferred embodiments without the worry of separation, blistering, pealing or flashover.

The coatings of preferred embodiments may use a defoamer surfactant to decrease the air bubbles created in the premixing, transportation, movement or post mixing, thus resisting separation and blistering when dry. Additionally, the coating may comprise additives such as water, thickening agents to increase viscosity, biocides and pesticides for the shelf life and product longevity and optionally a plasticizer to toughen the coating and increase the elasticity.

Coating compositions of the preferred embodiments can further comprise various conventional paint additives, such as dispersing aids, anti-settling aids, wetting aids, extenders, stabilizers, antifoams, texture-improving agents and/or anti-flocculating agents. The amounts of such additives are routinely optimized by the ordinary skilled artisan so as to achieve desired properties in the coating, such as thickness, texture, handling, and fluidity.

A coating of a preferred embodiment comprises from 1% to 98% solids by weight. The preferred coating compositions presented herein may be applied by one or two coats or as many times necessary so as to achieve sufficient coating of structural surface. For example, the preferred coating can be applied from about 4 mils to about 35 mils or more wet film thickness, which is equivalent to from about 2 mils to about 22 dry mils or more film thickness.

The preferred coating compositions presented herein may be applied to interior or exterior structural surfaces after coating with primers. For instance, structural surfaces may be painted with a primer before application of the preferred coating compositions. This product is ready to use where uncured cementitious surfaces are common, or where excessive amounts of alkali are present in the substrate. Primer is also for use on wood or approved metal surfaces. Desirable results are obtained, for example, when the primer is applied with an airless sprayer, and back rolled for desired finish.

The preferred coating application rate is approximately 10 to 80 square feet per gallon on heavy laced stucco; approximately 35 to 100 square feet per gallon on lighter textures, and 48 to 120 square feet on smooth surfaces (26 to 35 mils wet, 18 to 22 mils dry film thickness) via brush, spray or roller. Coverage will depend on surface porosity, and thinning is not recommended.

Example 12

The preferred coating, is prepared as a (24%) latex/(5%) fluoropolymer coating with 30% Sodium Silicate, having approximately 41% solids by weight. The preferred coating contains 0% organic solvents, and pigment is approximately 14% by weight (pigments include titanium dioxide).

Results of testing: A test of the subject fire coating was conducted on 6 Mar. 2008 in Fort Walton Beach Fla. The test comprised a wood two by four frame with two sides 8 foot tall and 4 foot wide. The two sides met at a 90 degree corner making a normal house corner wall. A full ceiling was not installed across the top of the frame. A metal roof piece tied the two wall sections together but left an opening that left a 1 foot by 1 foot opening at the corner of the frame. Two 8 foot by 4 foot plywood boards were attached to the frame. One plywood board was coated with the subject fire retardant material. The other plywood board was not coated. The coated plywood board was ¼ inch thick. The uncoated plywood board was ⅜ inch thick. The fire was generated using wood planks from a fence. The planks were broken into approximately 2 foot long segments. Two by fours were used as spacing between three or four layers of planks. Straw was placed in between the spaces. The wood was placed approximately 4 inches from each wall and was built to a height of approximately 1.5 feet. The fire was started without the use of accelerants. The fire ran for approximately 10 minutes.

Examination of the coated board and the uncoated board showed the coated board was not damaged on the backside by fire. The uncoated board had breakthrough from the front side to the back side. The uncoated board was severely damaged when compared to the front side.

Example 13

The preferred coating with thick yet a semi-pliable consistency, is prepared as a (5%) latex/(1%) fluoropolymer with (7%) sodium silicate, coating having approximately 87% solids by weight. The preferred coating contains 0% organic solvents, and pigment is approximately 15% by weight (pigments include titanium dioxide and/or other oxides/dioxides).

Percentages and selections of both emulsions and solids can be varied based on the need for the application. For example, the introduction of a fluoropolymer to the vinyl acrylic copolymer and/or in combination of the sodium silicate will enhance the ability to resist thermal absorption and conductivity, strengthen the rheological properties, and prolong the life of the coating. The same is true with the styrene/butadiene polymer latex.

The variation of percentages of the amorphous silicas such as the perlite and/or the fumed silica may differ with the need of the performance verses the importance of the appearance. For example while attempting to maintain a low thermal conductivity and/or high levels of diffraction; the fumed silica may dominate the perlite in volume to achieve a smooth finish, while the perlite may dominate or replace the fumed silica completely to achieve an affordable, high performance coating yet not as aesthetically pleasing in appearance.

For other economical purposes the introduction of microspheres and/or high percentages $TiO_2$ in the presence of one of more of the amorphous silicas may offset production cost while maintaining an acceptable flame retardant coating. While the combination of all of the aforementioned materials may vary in percentages and in high volumes can produce a superior diffractive, non conductive, and fire resistant coating.

For example, a high volume of $TiO_2$ in the presence of perlite and/or fumed silica with microspheres and suspended in one or more of the preferred high performance emulsions/binders and liquid silica; with the solid content of combined materials as low as 1% and as high as 95.5% will produce a coating that will reduce radiant conduction. $TiO_2$ has a high resistance to radiant conduction as well as reflective properties; when in the presence of amorphous silica, the combined physical properties of burn resistance and conduction/diffraction are enhanced.

The coatings can be applied by brush, roller, or commercial grad airless. Coverage rates will vary depending on surface porosity and texture. All surfaces should be sound, clean, and dry prior to application of the coating. All loose, flaking, or oxidized paint are removed from surface by sand blasting, water blasting, wire brushing, or scraping. Large cracks, holes and voids are filled in with cement patching compounds. Texture of patch matches the existing surface. Cracks less than ⅛ inch are filled.

Over a dry, clean, properly prepared surface the coatings are applied at an application rate dictated by the surface and purpose of the coating. Application is at uniform film thickness over the entire coated surface, vertical or horizontal. A wet edge is maintained during spraying, brushing or rolling at all times.

Drying to the touch occurs in approximately 2 hrs after application but is dependent upon humidity and temperature. For drying to hardness, a minimum of approximately 24 hours is needed after application. After 24 hours, residual matters in film will continue to cure with additional days of drying. Times are based on ideal weather with freezing temperatures.

Cement Compositions and Formulations

Insulating, heat resistant, high temperature hydraulic cement including masonry and mortar cement, can be used to make structural concrete, concrete pavement, roofing tiles, cinder blocks, ornamental concrete objects and numerous other concrete products. Insulating concretes are made using entrained air or materials such as perlite or vermiculite. These materials have low thermal conductivities which block heat transfer. Concrete made with these materials are lower in density as well as compressive strength. These materials are not normally used in structural concrete.

Insulating concrete is a lightweight concrete with a density of 50 pounds per cubic foot (PCF) or less. This concrete is made with cementing materials, water, air, and with or without aggregate and chemical admixtures. The density of the concrete ranges from 15 to 50 PCF and the 28-day compressive strength is generally between 100 and 1000 pounds per square inch (PSI). Cast-in-place insulating concrete is used primarily for thermal and sound insulation, roof decks, fill for slab-on-grade sub bases, leveling courses for floors or roofs, firewalls, and underground thermal conduit linings. Aggregates such as perlite, vermiculite, or expanded polystyrene beads are used to make most insulating concretes. Air content in light weight insulating concrete can be as high as 25% to 35%.

In one embodiment, a moderate-strength lightweight concrete is made from cementing materials, water, air, and with or without aggregate and chemical admixtures and has a density of 50 to 120 PCF and achieves compressive strengths of 1000 to 2500 PSI. At lower densities, it is used as fill for thermal and sound insulation of floors, walls, and roofs and is referred to as fill concrete. At higher densities it is used in cast-in-place walls, floors and roofs, and precast walls and floor panels. Aggregates manufactured by expanding, calcining, or sintering materials such as blast furnace slag, clay, diatomite, fly ash, shale, or slate, or by processing natural materials such as pumice, scoria, or tuff.

A third embodiment of a type of insulating concrete (cellular concrete) is made by incorporating into a cement paste or cement-sand mortar a uniform cellular structure of air voids. Densities ranging between 15 and 120 PCF are obtained by substitution of air voids for some or all of the aggregate particles. Air voids can consist of up to 80% of the cement volume. Cellular concretes are handled as liquids and are pumped or poured into place without further consolidation.

One skilled in the art will recognize that insulating and moderate-strength lightweight concretes normally are not required to withstand freeze-thaw exposure in a saturated condition. In service they are normally protected from the weather, unlike standard hydraulic cements.

Currently, normal density concrete with densities ranging from about 120 to about 150 pcf are not normally insulating or able to sustain temperatures above 300° F. without deterioration of the concrete by explosive spalling (spalling is a physical process of the breakdown of surface layers of masonry (typically concrete) which crumble into small pebble-like pieces in response to high temperatures and/or mechanical pressure). Structural concrete uses concrete densities in this range. Compressive strengths range from 2500 psi to above 6500 psi. Concrete with compressive strengths above 6500 psi are considered high strength concretes. Flexural strength of structural concrete requires a minimum of 450 psi. For instance, military application of high temperature normal density concrete require compressive strengths above 450 psi, flexural strength above 650 psi and the capability of sustaining 1800 F temperatures for nearly a minute without concrete deterioration. Currently, high temperature (above 1800° F.) concretes capable of withstanding these temperatures for sustained periods have not been available.

Portland cement is the standard utilized in nearly all cement uses. Portland cement is a product name and is sold by numerous companies under that name. The term Portland cement is used to indicate that the cement was produced in a certain way.

Hydraulic Cements

Hydraulic cements set and harden by reacting chemically with water. These cements are used in all aspects of concrete construction. Hydraulic cement includes Portland cement, modified Portland cement, blended hydraulic cements, masonry cements and mortar cements. The term "modified Portland cement" usually refers to blended cement containing mostly Portland cement along with a small amount, less than 15% of mineral additive. However, this is not always the case. The modification may merely refer to a special property that cement has or to cement that has the characteristics of more than one type of Portland cement. ASTM C 219 describes terms relating to hydraulic cements.

Fly ash, ground granulated blast-furnace slag, silica fume, and natural pozzolans, such as calcined shale, calcined clay or metakaolin, are materials that when used in conjunction with Portland or blended cement, contribute to the hardened concrete through hydraulic or pozzolanic activity or both. A pozzolan is a siliceous or aluminosiliceous material that, in finely divided form and in the presence of moisture, chemically reacts with the calcium hydroxide released by the hydration of Portland cement to form calcium silicate hydrate and other cementitious compounds. All the materials referred to in this paragraph are considered supplementary cementitious materials and can be added to Portland cement or used as a replacement for a percentage of the total cementitious materials in a cement mix.

Portland cement or a mixture of Portland cement with any other cementitious materials forms a paste when mixed with water. The paste binds the aggregates into a rocklike mass and as the paste hardens because of the chemical reaction of the cement and water. The hardened mass is called concrete. The aggregates are normally divided into coarse and fine aggregates. Fine aggregates consist of natural or manufactured sand with the particle sizes ranging up to ⅜ inch. Coarse aggregates are particles with sizes ranging up to 6 inches. The paste constitutes about 25% to 40% of the total volume of concrete. The volume of cement ranges from 7% to 15% and water from 14% to 21%. Air content in air-entrained concrete ranges from about 4% to 8%. Aggregates make up about 60% to 75% of the total volume of concrete. In properly made concrete, each and every particle of aggregate is completely coated with paste and all of the spaces between aggregate particles are completely filled with paste.

The basic concrete produced is comprised mainly of hydraulic cements Portland cement, coarse aggregates, and fine aggregates which can withstand temperatures up to approximately 300° F. Coarse aggregates are normally crushed rock or gravel and sand is the fine aggregate. Fine aggregates consist of natural or manufactured sand with particle sizes ranging up to ⅜ inch and coarse aggregates are particles ranging from ⅜ inch to 6 inches in size. Coarse aggregates are typically ¾ inch to 1 inch in size. An intermediate-sized aggregate ⅜ is sometimes added to improve the overall aggregate gradation.

Types of Portland Cement

Type I is a general-purpose cement suitable for all uses where the special properties of other types are not required. Its uses in concrete include pavements, floors, reinforced concrete buildings, bridges, tanks, reservoirs, pipe, masonry units, and precast concrete products. Type II is Portland cement used where precaution against moderate sulfate attack is important. Use of Type II cement in concrete must be accompanied by the use of a low water to cementitious material ratio and low permeability to control sulfate attack. Type III Portland cement provides strength at an early period, usually a week or less. It is chemically and physically similar to Type I cement, except that its particles have been ground finer. It is used when forms need to be removed as soon as possible or when the structure must be put into service quickly. Type IV Portland cement is used where the rate and amount of heat generated from hydration must be minimized. It develops strength at a slower rate than other cement types. Type IV cement is intended for use in massive concrete structures, such as large gravity dams. Type V Portland cement is used in concrete exposed to severe sulfate action, principally where soils or ground waters have a high sulfate content.

The cement blends described in the preferred embodiments can be blended with any of the types of Portland cement described above without any problems. The blends discloses in the examples below provide superior performance in extreme temperatures, especially extreme heat. Because the blends are not water permeable, they also provide superior performance in extreme cold weather because there is no moisture absorption to expand and crack or otherwise damage the concrete. The preferred embodiments are also impervious to chemicals and other spillage.

Fly ash, ground granulated blast-furnace slag, calcined clay, metakaolin, calcined shale, and silica fume contribute to the strength gain of concrete. However, the strength of concrete containing these materials can be higher or lower than the strength of concrete using Portland cement as the only cementing material. Tensile, flexural, torsional, and bond strength are affected in the same manner as compressive strength.

Silica fume contributes to strength development primarily between 3 and 28 days, during which time a silica fume concrete exceeds the strength of a cement-only control concrete. Silica fume also aids the early strength gain of fly ash-cement concretes.

Strength gain can be increased by: (1) increasing the amount of cementitious material in the concrete; (2) adding high-early strength cementitious materials; (3) decreasing the water-cementing materials ratio; (4) increasing the curing temperature, or (5) using an accelerating admixture.

Concretes made with certain highly reactive fly ashes (especially high-calcium Class C ashes) or ground slogs can equal or exceed the control strength in 1 to 28 days. Concretes containing Class C ashes generally develop higher early-age strength than concretes with Class F ashes.

The impact resistance and abrasion resistance of concrete are related to compressive strength and aggregate type. Supplementary cementing materials generally do not affect these properties beyond their influence on strength. Concretes containing fly ash are just as abrasion resistant as Portland cement concretes without fly ash.

The effects of temperature and moisture conditions on setting properties and strength development of concretes containing supplementary cementing materials are similar to the effects on concrete made with only Portland cement, however, the curing time may need to be longer for certain materials with slow-early-strength gain.

High doses of silica fume can make concrete highly cohesive with very little aggregate segregation or bleeding. With little or no bleed water available at the concrete surface for evaporation, plastic cracking can readily develop, especially on hot, windy days if special precautions are not taken.

Proper curing of all concrete, especially concrete containing supplementary cementing materials, should commence immediately after finishing. A seven day moist cure or membrane cure should be adequate for concretes with normal dosages of most supplementary cementitious materials. As with Portland cement concrete, low curing temperatures can reduce early-strength gain.

Fly ash, natural pozzolans, and ground slag have a lower heat of hydration than Portland cement; consequently their use will reduce the amount of heat of hydration similar to moderate heat cement. Some pozzolans have a heat of hydration of only 40% that of Type I Portland cement. This reduction in temperature rise is especially beneficial in concrete used for massive structures. Silica fume may reduce the heat of hydration.

The use of fly ash and ground granulated blast-furnace slag will generally retard the setting time of concrete. The degree of set retardation depends on factors such as the amount of Portland cement, water requirement, the type and reactivity of the slag or pozzolan dosage, and the temperature of the concrete. Set retardation is an advantage during hot weather, allowing more time to place and finish the concrete. However, during cold weather, pronounced retardation can occur with some materials, significantly delaying finishing operations. Accelerating admixtures can be used to decrease the setting time. Calcined shale and clay have little effect on setting time.

Aggregates are inert granular materials such as sand, gravel, or crushed stone that, along with water and Portland cement are an essential ingredient in concrete. Aggregates need to be clean, hard, strong particles free of absorbed chemicals or coatings of clay and other fine materials that could cause the deterioration of concrete. Aggregates, which account for 60 to 75 percent of the total volume of concrete, are divided into two distinct categories—fine and coarse. Fine aggregates generally consist of natural sand or crushed stone with most particles passing through a ⅜ inch (9.5 mm) sieve. Coarse aggregates are any particles greater than 0.19 inch (4.75 mm), but generally range between ⅜ and 1.5 inches (9.5 mm to 37.5 mm) in diameter. Gravels constitute the majority of coarse aggregates used in concrete with crushed stone making up most of the remainder. Crushed aggregate is produced by crushing quarry rock, boulders, cobbles, or large-size gravel.

Particle shape and surface texture influence the properties of freshly mixed concrete more than the properties of hardened concrete. Rough-textured, angular, and elongated particles require more water to produce workable concrete than smooth, rounder compact aggregate. Consequently, the cement content must also be increased to maintain the water-cement ratio. Generally flat and elongated particles are avoided or are limited to about 15 percent by weight of the total aggregate.

Unit-weight measures the volume that graded aggregate and the voids between them will occupy in concrete. The void content between particles affect the amount of cement paste required for the mix. Angular aggregate increases the void content. Larger sizes of well-graded aggregate and improved grading decrease the void content. Absorption and surface moisture of aggregate are measured when selecting aggregate because the internal structure of aggregate is made up of solid material and voids that optionally contain water. The amount of water in the concrete mixture must be adjusted to include the moisture conditions of the aggregate. Abrasion and skid resistance of an aggregate are essential when the aggregate is to be used in concrete constantly subject to abrasion as in heavy-duty floors or pavements. Different minerals in the aggregate wear and polish at different rates. Harder aggregate can be selected in highly abrasive conditions to minimize wear.

Redcolite Concrete Aggregate is an expanded perlite of very low density, meeting the requirements of ASTM C332. Portland cement mixes using Redcolite as the sole aggregate have been designed to produce ultra-light concrete with dry densities from 22 lb per cubic foot to 77 lb per cubic foot. Compressive strength can range between 90 and 1,900 psi. Insulation value increases dramatically as the density decreases.

The concrete formulations listed in the preferred embodiment have greater durability than normal Portland cement concrete used as structural strength concrete, or in other building materials such as concrete block, and roofing tiles. Because the concrete does not have voids as does normal Portland cement concrete cracking of the concrete due to freeze thaw does not occur.

For purposes of this disclosure, cementitious materials include Portland cement, silica fume, fly ash, fused silica, blended hydraulic cement, ground granulated blast-furnace slag, calcined clay, metakaolin, calcined shale, and rice husk ash.

The formulations of preferred embodiments use Portland cement with other cementitious materials to make insulative high temperature concrete which meets compressive and flexural strength requirements as well as can withstand temperatures significantly greater than 300° F. without deteriorating. Conventional concrete deteriorates by cracking and explosive spalling when subjected to heat above 300° F. over a short period of time. Cement compositions presented herein contain at least one additional cementitious material which increases compressive and flexural strength of the concrete as well as exhibit favorable heat transfer and thermal expansion characteristics. The cementitious materials used include but are not limited to fly ash, silica fume, ground granulated blast-furnace slag, volcanic ash, and natural pozzolans such as calcined shale, calcined clay or metakaolin. Hollow ceramic microspheres may also be added to the cement mix to allow heat transfer to and from the high temperature concrete surface. The preferred ceramic microspheres are ceramic, but other microspheres made of glass, plastic, poly vinyl chloride (PVC), etc., can be used depending upon the temperature the concrete will be subjected to. These microspheres aid in the removal of heat from the concrete. Refractory materials may also be added to the preferred cement mix to increase the hardness, temperature resistance, and to reduce thermal expansion of the high temperature concrete. The refractory material being used in the preferred embodiment is fused silica. High temperature concretes using the preferred embodiments have been exposed to temperatures in excess of 4000° F. for periods of over 6 minutes without deteriorating by cracking or explosive spalling.

Aggregates added in high temperature concrete should be no larger than 3/8 inch to prevent excessive expansion of the aggregate with the addition of high heat. Aggregates in the preferred embodiments are 3/8 of an inch and less. Normal concrete can have aggregates ranging in size from 3/8 inch to 1.5 inches.

In the preferred embodiments, reflection and diffraction of the heat meeting the high temperature concrete surface is used to cause significant remittance of the heat to the surface which results in cooling of the concrete surface to below 200° F. in approximately ten minutes after the heat source is removed. Diffraction is accomplished by using cementitious materials, refractory materials, and other mineral and silica additives in the particle range of from 1 to 75 microns. Use of larger particle sizes may be used but must be tested first to ensure they do not degrade the heat resistance qualities desired. The use of materials within the particle range listed above results in a concrete with essentially no voids large enough to allow the heat wave to pass without being broken up and redirected. In a well mixed concrete the voids will be in the 1 to 75 micron range. This also increases durability of the concrete. Heat will not easily be absorbed by the concrete described in the preferred embodiments. Some heat will be absorbed by the concrete but will be re-emitted to the atmosphere during the night. In the preferred embodiment, no heat will build up in the concrete from daily heating and cooling as with normal Portland cement concrete.

In the embodiments disclosed herein, the concrete produced using the cement blends from is self curing. That is, it does not require a moisture barrier on the concrete surface to prevent loss of moisture during the first seven days. Loss of moisture during the curing process can cause surface cracking. No special curing procedures are required for the preferred embodiments disclosed herein. Cracking will not occur during normal environmental conditions, including heat or wind.

The compressive and flexural strength of the concrete described in the preferred embodiments is much higher than in normal weight concrete made with Portland and other cementitious materials alone. The compressive strength of normal weight concrete ranges from 3000 psi to 6000 psi. The compressive strength of the preferred embodiments ranges from 7500 to 11,600 depending upon the aggregates used to make the cement. The flexural strength is usually 450 psi. The flexural strength of the concrete described in the preferred embodiments ranges from 850 psi to 1560 psi depending upon the aggregates used to make the concrete. Crushed limestone with a diameter no greater than 3/8 inch has provided the maximum compressive and flexural strengths.

The concrete as described in the preferred embodiments performs as does concrete made from Portland cement when being poured and finished and is no more hazardous during mixing and pouring.

In the preferred embodiments, the durability of the concrete of the preferred embodiments is superior to the known concrete compositions because the concrete disclosed in the preferred embodiment does not have any voids large enough to produce cracking during periods of freezing and thawing. Further, the concrete described in the preferred embodiments does not expand and contract and does not require expansion joints as does concrete made from normal Portland cement. Since all the solids used in the preferred embodiments are in the micron range, durability of any formulation disclosed herein will have the same durability.

Specific formulations using the preferred embodiments can be formulated to meet specific weight, strength, and heat resistance requirements. In addition existing Portland cement or other concrete can be modified to make regular weight concrete light weight concrete. This can be achieved by removing a volume of the course aggregates or volume of course and fine aggregates from the concrete and replacing these aggregates with a mix of the materials of the preferred embodiments leaving out the Portland cement. The Portland cement in the existing formulation should be sufficient to make the new lightweight concrete. No more than 30% of the existing aggregates should be removed from the original concrete mix. Removing more than 30% will result in the lost of strength of the new lightweight concrete. Additional Portland cement will need to be added to keep the strength in place. The water volume should also be recalculated to reduce water to cement ratio of the new concrete.

The concrete described in the preferred embodiments is green. Buildings or other structures constructed of concrete blocks, exterior wall boards, bricks, roofing tiles, stucco and the like, which use the cement described or a variation of the cement described in making the building material will if used on the outside of the structure it will keep heat as well as cold out. Building materials used on the inside of the house will keep the cool air in during the summer and the hot air out during the winter. There will be significant energy savings by use of building materials containing cement described in the preferred embodiments.

The heat of hydration is less than that of normal Portland cement concrete. The concrete is dry to the touch in about two hours and can be walked on without damage in four hours. This was tested outside when the air temperature was approximately 55 F with a blowing wind. No cracking occurred without using normal moist curing methods.

The Heat Resistant Non-Conductive Composition

The heat resistant non-conductive compositions of preferred embodiments comprise a mixture of ingredients. The mixture comprises fumed silica, fused silica, ceramic beads, Perlite 416, Perlite 476, Class C Fly Ash, pea gravel, play sand, cement, water and Plastisol 5700. The mixture may comprise other preferred ingredients as described below. The composition, when set, will be heat resistant, will not easily conduct heat and provides insulation for hot and cold.

Example 14

A heat resistant, non-conductive material is prepared as follows. Mix 62 grams fumed silica, 1000 grams ceramic beads, 644 grams Perlite 416, 644 grams Perlite 476, 2725 grams Class C Fly Ash, 2100 grams fused silica, 30,475 grams pea gravel, 30, 700 grams play sand, 2775 grams of cement, and Plastisol 5700. Introduce the peas gravel to the mixer first. Add 5th and 6th ingredients followed by the first four ingredients mix well for two minutes. Add one half the cement to the mixer. After mixing for one minute add 75% of the water by weight. Then add all 6 ounces of the super plasticizer. The cement in the mixer should be very liquid. Add the sand to the mix followed by the final 25% of the water. Then add the rest of the cement. Let the concrete mix for 2 minutes and pour into a mold. The above mixture will make approximately 1.57 cubic feet of concrete. The water/cement ratio is measured as 0.33(61.2+4.43+6)=0.33(71.83) =23.7 lbs (10, 762 grams).

Cementitious Thermal Blocking Finishes Formulation Examples (Stucco)

In the preferred method of creating a Cementitious Thermal Blocking Finish (Stucco), the composition achieves durability, reduced energy consumption and a quality aesthetic appearance:

Durability is achieved through the introduction of preferred materials (milled and/or expanded perlite, microspheres and fumed silica) that reduce the thermal absorption and conduction to cementitious materials such as Portland cement, which in turn reduces the tendency to expand and contract. Also these same materials when introduced in proper particle size (measured in micros), will strengthen compression properties of the cement and create a high resistance to deteriorating under harsh weather conditions.

Energy reduction is also achieved with the same preferred materials but for a different purpose. The preferred materials will reduce the thermal absorption and conduction which in turn will reduce the load on environmental control units within a structure thus reducing the energy consumption.

An aesthetically pleasing appearance is achieved via the preferred materials which allow colored oxides to be easily and efficiently introduced and dispersed to create a variety of colors for the stucco product without compromising the thermal properties.

Weather resistance can be further enhanced through the introduction of preferred polymers and copolymers. The presence of the Vinyl Acrylic Copolymer increases mold resistance and creates a moisture barrier without compromising the breathability of the stucco. To further enhance the perform; the introduction of the Elastomeric Acrylic Latex Polymer will assist the stucco in rheological properties so to be able to flex under structural shifting or movement due to weight settling or environmental forces.

The coatings of preferred embodiments optionally use a defoamer surfactant to decrease the air bubbles created in the premixing, transportation, movement or post mixing, thus resisting separation and blistering when dry. Additionally, the coating may comprise additives such as water, thickening agents to increase viscosity, biocides and pesticides for the shelf life and product longevity and optionally a plasticizer to toughen the coating and increase the elasticity. Coating compositions of the preferred embodiments can further comprise various conventional paint additives, such as dispersing aids, anti-settling aids, wetting aids, extenders, stabilizers, anti-foams, texture-improving agents and/or antiflocculating agents. The amounts of such additives are routinely optimized by the ordinary skilled artisan so as to achieve desired properties in the coating, such as thickness, texture, handling, and fluidity.

Example 15

Percentages are measured by weight: Manufacture Production Fine Cement (Portland is Preferred) 92.3% TiO2 1% Mix 5 minutes: Fumed Silica 6% Mix 15 minutes: Perlite 16 micron's 1.8% Perlite 76 micron's 1.8% Mix 10 minutes: Ceramic Micro Spheres 2.9% Adjust RPM's as needed: Mix for 20 min.

Note that non-milled, expanded volcanic glass (preferred perlite), can be used in place of materials or added to this formula to achieve the required cost and/or aesthetic appeal. The preferred materials with the exception of the cement can be replaced by either of the Dry Thermal and Fire Retardant Filler D3 or the MASC #10-D3 or variants thereof.

Post Production (on site mixing procedures) Dry Stucco Mixture 32% H2O 33% Mix for 5 minutes or until materials are thoroughly dispersed: Fine Sand 35% Mix for 5 minutes or until materials are thoroughly dispersed: Alternative Additives: Primary Additive after all previous components are thoroughly mixed: Preferred Vinyl Acrylic Copolymer 5%; (ratio to total of previous mixture) Mix for 5 minutes or until materials are thoroughly dispersed: Secondary Additive after all previous components are thoroughly mixed: Preferred Elastomeric Acrylic Latex Polymer 3%; (ratio to total of previous mixture) Mix for 5 minutes or until materials are thoroughly dispersed:

Example 16

Dry Thermal and Fire Retardant Filler—(D3) Percentages are measured by weight: Perlite 16 micron's 27% Perlite 76 microns 27% TiO2 1% Fumed Silica 3% Ceramic Micro Spheres 41% Add each component slowly; adjust to high RPM's: Mix for 1 hour.

Example 17

Dry Thermal and Fire Retardant Filler—(trade name MASC #10-D3) is prepared as follows: Percentages are measured by weight: H2O 56% TiO2 5.5% Grid for 10 min. Rheological Plasticizer 1.7% Fumed Silica 1.1% Mix at medium speed for 5 min. Perlite 16 microns 10% Perlite 76 micron's 10% Ceramic Micro Spheres 15.7% Add each component slowly; adjust to high RPM's: Mix for 15 min. Mix at high RPM's in enclosed mixer in the presence of a mechanical dehydration unit until mixture is completely dehydrated into a fine powder: mill if necessary.

Example 18

The formulation of the following preferred high temperature cement, termed Okaloosa Cement Blend #10, Military Grade, has withstood high temperature testing. Concrete specimens two foot in diameter and six inches thick were subjected to 1800 F temperatures exiting a one inch nozzle at a velocity of nearly MACH 1 at one inch from the surface of the concrete. Prior to being subjected to the 1800 F heat source the concrete specimen was placed in a cooler until the surface temperature was 34 F. The concrete specimen was then removed from the cooler and a cup of oil and a cup of water was placed on the surface. Then the concrete specimen began the heating cycle. The concrete specimen was subjected to 300 passes, with each pass having the concrete specimen cooled, coated with oil and water, and then heated to 1800 F.

The following formulation is a high strength concrete with a density range of 145 to 155 pounds per cubic foot (pcf). With a 28 day cure compressive strength of between 7,500 and 11,600 psi and flexural strength 850 to 1560 psi depending upon the aggregate used.

Example 18

Cementitious Material

The primary cementitious material in the cement mix is Portland cement Type I/II. The other cementitious material in the mix is class c fly ash. In the military grade, for the purpose of determining water addition fused silica is also considered a cementitious material. Substitution or addition of other cementitious materials is allowed.

The insulating and/or high temperature concrete is self curing. After pouring it does not requiring curing compounds, coverings, or addition of moisture to prevent cracking.

The aggregates used to make high temperature concrete can be either river rock, crushed stone, or other materials including light weight aggregates. The size of the aggregate is the most important characteristic for high temperature concrete. The size of the aggregate should be no larger than 3/8 inch in diameter. For aggregate sizes greater than this it is much harder to insulate the aggregate from the heat. Since many of the aggregates contain water to some degree an increase in aggregate temperature above the boiling point will cause the aggregate to fracture and cause spalling.

Mixing of all formulations is in the following order: 1. Water, 2. Cement Mix 3. Crushed Stone or other Aggregate 4. Superplasticer 5. Sand.

Add the following components to the blender/mixer:

| Material | Weight | Preferred %* | Percentage Range* |
|---|---|---|---|
| a. Portland Cement | 150 lbs | (233.9 lbs; 78.7%) | 60.0-87.7% |
| b. Titanium Dioxide | 3 lbs | 1.0% | 0.0-5.0% |
| Mix for 5 minutes | | | |
| c. Fumed Silica | 0.6 lbs | 0.2% | 0.1-3.0% |
| d. Portland Cement | 50 lbs | | |
| Mix for 15 minutes | | | |
| e. Perlite 416 | 5.35 lbs | 1.8% | 0.0-3.6% |
| f. Perline 476 | 5.35 lbs | 1.8% | 0.0-3.6% |
| g. Portland Cement | 33.9 lbs | | |
| Mix for 10 minutes | | | |
| h. Fused Silica | 17.7 lbs | 5.9% | 0.0-10.0% |
| i. Class C Fly Ash | 22.9 lbs | 7.7% | 0.0-30.0% |
| Mix 10 minutes | | | |
| j. Microbeads | 8.5 lbs | 2.9% | 1.0-4.5% |
| Mix 15 Minutes | | | |

*Percent is by weight
Mix Total LBS = 297.3 lbs (makes 6.06 cubic feet of cement mix)
Mix = 49 lbs per cubic foot;
Gravel = 43 lbs per cubic foot;
Sand = 43 lbs per cubic foot;
Total Weight = 135 lbs per cubic foot Concrete Mixing Process (order of addition of materials to mixer): Add 6.9 liters of water (15.1 lbs) per cubic foot of cement mix; Add OC Blend #10 to mixer; Mix for 5 minutes; Add Aggregate (pea gravel, crushed stone, stone, river rock, etc.) to mixer; Mix for 2 minutes; Add superplasticer to mix; Add sand to mixer; Mix for 10 minutes; Add 3.5 ounces volume of superplasticer per cubic foot of concrete made.

The following information applies to all examples and other formulations using the different cementitious materials, silicas, pozzalans both natural and man-made.

Preferred superplasticer is Plastol 5700, a high range water reducing admixture, made by the Euclid Chemical Company, wwwleuclidchemical.com. Any superplasticer can be used. Trial mixes on a small scale should be made to ensure the amount provided in the above formulation does not change with a different superplasticer.

A crushed stone aggregate should be used for higher strength (above 7500 psi at 28 days). Pea gravel will achieve 7500 psi in 28 days, crushed stone will achieve 10,000 psi in 7 days and average 11,600 psi in 28 days. Aggregate size should be 3/8 inch diameter or less. Crushed limestone 3/8 diameter is the preferred crushed aggregate in the above concrete mix.

OC Blend #10 is the preferred blend of materials for the above formulation. Material substitutions can be made depending upon the strength, and density of concrete desired. As long as silica based materials, refractory materials, and other powders are used with a particle size from 1 to 150 microns is used the final concrete will have insulating and fire resistant qualities as well as being able to withstand temperatures above 3000 F for over 1 minute.

The above preferred concrete will pour, set up and finish like normal Portland cement. The cement can have a broomed finish and can be walked on in 4 hours after pouring. Heat of formation is slightly lower than that of normal Portland cement.

As with normal Portland concrete the above preferred formulation achieves 75 to 80 percent of its final strength in the first seven days. The above concrete is self curing and does not require added surface moisture or other curing agents during the first seven days to prevent surface cracking.

The above preferred formulation is durable. There are no voids above 75 microns in the concrete due to the small particle size of each ingredient. The particle size is the key to the insulating quality of the concrete. Heat is blocked from going through the concrete and is re-emitted to the atmosphere instead of being absorbed by the concrete. Heat from the day will not penetrate more than 1/8 inch into the top of the concrete. A high temperature torch (MAPP Gas; 4200 F) held with the flame just touching the surface of the concrete for approximately 1.5 minutes will have a surface temperature of approximately 1800 F when the torch is turned off. Within 15 minutes the temperature will be below 300 F and at 30 minutes the concrete surface will be at ambient temperature. There will be no deterioration of the concrete surface.

The slump of the above concrete when poured should be between 3.5 and 4.5 inches, not to exceed 4.5 inches. The entrained air in the concrete is around 3.5 inches. This is less than half of normal Portland cement concrete. Entrained air can be above 25% if normal concrete is being made insulative or increased durability is required. It is not recommended to add admixtures which increase entrained air into the above preferred mix or other formulations.

In other embodiments, the mix can be added to PVC pipes, all cementitious materials, wall board (both cement and plaster), vinyl siding, Bondo and any resins used for building materials. The mixes in the above examples can all be added as well as other variations of the preferred mixes depending upon insulative, fire & heat resistance required, and density of concrete (pounds per cubic foot).

Example 19

Concrete mix below makes approximately 400-14 inch×14 inch×1 inch light weight stepping stones weighting approximately 11.6 lbs each. Uses OC Blend #1. Blocks, stepping stones, roofing tiles are insulating and will take high temperature greater than 3000 F for a minimum of 1 minute.

| OC Blend #1 Formulations | | |
|---|---|---|
| | 45 grams | Fused Silica |
| | 500 grams | Microbeads |
| | 650 grams | Perlite 416 |
| | 650 grams | Perlite 476 |
| | 25 grams | Class C Fly Ash |
| | 75 grams | Fused Silica |
| Total | 1845 grams | (4 lbs) |

| Light Weight Stepping Stone, Block, and Roofing Tile Formulation | |
|---|---|
| 2000 lbs | Portland Cement |
| 2400 lbs | Sand |
| 200 lbs | OC Blend #1 |
| 2000 oz | of superplastizer |

| Cement Mix Procedure | | | |
|---|---|---|---|
| Material | Weight | Preferred %* | Percentage Range* |
| a. Portland Cement | 1200 lbs | (2000 lbs; 90.0%) | 60.0-92.0% |
| b. Titanium Dioxide | 22 lbs | 1.0% | 0.0-3.0% |
| Mix for 5 minutes | | | |
| c. Fumed Silica | 4.8 lbs | 0.22% | 0.1-3.0% |
| d. Portland Cement | 500 lbs | | |
| Mix for 15 minutes | | | |
| e. Perlite 416 | 65 lbs | 2.9% | 0.0-4.0% |
| f. Perlite 476 | 65 lbs | 2.9% | 0.0-4.0% |
| g. Portland Cement | 300 lbs | | |
| Mix for 10 minutes | | | |
| h. Fused Silica | 8.2 lbs | 0.37% | 0.0-4.0% |
| i. Class C Fly Ash | 2.8 lbs | 0.13% | 0.0-2.0% |
| Mix 10 minutes | | | |
| j. Microbeads | 54.2 lbs | 2.5% | 1.0-4.5% |
| Mix 15 Minutes | | | |

*Percent is by weight
Mix Total LBS = 2,222 lbs

Concrete Mix Procedure
Add water to mixer at 0.33 water to cement ratio; Add all OC Blend #1 to mixer; Mix for 5 minutes; Add superplasticer at 3.5 ounces volume per cubic foot of concrete being made; Mix for 1 minute; Add sand to mixer; Mix for 10 minutes; Pour into forms Example 20

95 pound/cubic foot concrete
(Structural Concrete)
Formulation passed 3000 psi Compression Strength Test
Below formulation makes 1 cubic foot of moderate weight concrete. The concrete is insulating, heat resistant, and will accept temperatures in excess of 3000 F without failure due to cracking and explosive spalling.

| | |
|---|---|
| Portland Cement I/II = | 16.3 lbs |
| Class C FlyAsh = | 5.5 lbs |
| Stone = | 38.0 lbs |
| Sand = | 32.4 lbs |
| OC Blend #1 = | 2.3 lbs |
| Perlite 416 = | 1.14 lbs |
| Water = | 1.22 gallons |

The mix is blended the same as above. This is the only structural light weight concrete that is insulating and capable of taking temperatures above 3000° F. without cracking or having explosive spalling. This embodiment does not use entrained air to achieve light weight. The normal strength concrete can withstand temperatures greater than 4000° F. for 6 minutes without cracking or explosive spalling.

Any superplastizer can be added to the concrete mix, the preferred superplastizer is Plastol 5700.

Testing of normal weight concrete (145 psi to 155 psi) at a military facility at Port Hueume, Calif. For example vertical or short take off aircraft use high temperature jet engine exhaust directed at the pavement surface to lift vertically above the pavement during takeoffs and landings. Temperatures achieved during takeoffs and landings achieve 1800° F. with exhaust air velocities near the speed of sound.

High temperature heat tests of the concrete formulation provided in example 1 were conducted. The concrete specimen used was 2 foot in diameter and 6 inches deep. The concrete specimen was cycled 300 times without failure. One cycle of the test consisted of the following steps. The concrete specimen was first placed in a cooler until the surface temperature was at 34° F. The concrete specimen was then removed from the cooler and a cup of oil and a cup of water was poured on the surface of the concrete. The concrete specimen was then placed under a one inch nozzle one inch from the surface of the concrete with 1800° F. air coming from the nozzle at MACH 1 velocity. The concrete specimen was pushed under the nozzle resulting in approximately one inch exposure path from the edge of the concrete to the center of the concrete. The nozzle remained at the center of the concrete surface for approximately 4 to 5 seconds. Total exposure of the concrete to the heat was 10 seconds. The temperature of the surface of the concrete was 195° F. immediately upon removal from the concrete. The temperature of the concrete surface was at ambient temperature after 2 minutes. The concrete specimen was then returned to the cooler and the surface temperature monitored until it reached 34 degrees. Then the above process was continued. 300 cycles was the passing point for the concretes to be considered high temperature.

Concrete specimens of the above embodiment provided as Example 1 also passed compressive and flexural test limits required for the high temperature concrete. The requirements for the compressive and flexural test were 4500 psi and 650 psi respectively. The concrete listed in example one had compressive strengths of 7500 to 8500 using pea gravel and above 11,000 psi when using crushed limestone ⅜ inch diameter as the aggregate. Sand was used as the fine aggregate. These tests were after a 28 day cure.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

What is claimed is:

1. A cement blend for making concrete, the cement blend comprising:
   60-90 wt. % Portland cement
   0.1-6 wt. % fumed silica having an average particle size of from 1 to 150 microns;
   1.9 wt % hollow microspheres; and
   0.1-10 wt. % titanium dioxide.

2. The cement blend of claim 1, further comprising
   0.1-7 wt. % perlite;
   0.1-20 wt. % fused silica; and
   0.1-40 wt. % fly ash.

3. The cement blend of claim 2, comprising
   60-88 wt. % Portland cement;
   0.1-3 wt. % fumed silica;
   1-4.5 wt. % microspheres;
   0.1-5 wt. % titanium dioxide;
   0.1-3.6 wt. % perlite;
   0.1-10 wt. % fused silica; and
   0.1-30 wt. % fly ash.

4. The cement blend of claim 1, wherein the hollow microspheres have a mean particle size of 80 microns+/−8 microns and a particle size of from 10 to 500 microns.

5. The cement blend of claim 2, wherein the fused silica has an average particle size of from 1 to 150 microns.

6. A method for forming the cement blend of claim 2, the method comprising, in sequence:
   combining Portland cement and titanium dioxide to obtain a combination;
   mixing the combination for two to twenty minutes;
   adding fumed silica and Portland cement to the combination;
   mixing the combination for two to twenty minutes;
   adding perlite and Portland cement to the combination;
   mixing the combination for two to twenty minutes;
   adding fused silica and fly ash to the combination;
   mixing the combination for two to twenty minutes;
   adding microspheres;
   mixing the combination for two to twenty minutes;
   adding perlite and Portland cement to the combination; and
   mixing the combination for two to twenty minutes;
   whereby a cement blend is obtained.

7. A method for forming the cement blend of claim 2, the method comprising, in sequence:
   combining Portland cement and titanium dioxide to obtain a combination;
   mixing the combination for five to fifteen minutes;
   adding fumed silica and Portland cement to the combination;
   mixing the combination for five to fifteen minutes;
   adding perlite and Portland cement to the combination;
   mixing the combination for five to fifteen minutes;
   adding fused silica and fly ash to the combination;
   mixing the combination for five to fifteen minutes;
   adding microspheres;
   mixing the combination for five to fifteen minutes;
   adding perlite and Portland cement to the combination; and
   mixing the combination for five to fifteen minutes;
   whereby a cement blend is obtained.

8. A method for forming a concrete, the method comprising, in sequence:
   adding water to a blender;
   adding a cement blend according to claim 1 to the blender to obtain a combination;
   mixing the combination for two to twenty minutes;
   adding aggregate to the blender;
   mixing the combination for two to twenty minutes;
   adding superplasticer to the blender;
   mixing the combination for two to twenty minutes;
   adding sand to the blender; and
   mixing the combination for two to twenty minutes;
   whereby a concrete is obtained.

9. A method for forming a concrete, the method comprising, in sequence:
   adding water to a blender;
   adding a cement blend according to claim 1 to the blender to obtain a combination;
   mixing the combination for five to fifteen minutes;
   adding an aggregate to the blender;
   mixing the combination for five to fifteen minutes;
   adding a superplasticer to the blender; and
   mixing the combination for five to fifteen minutes;
   adding sand to the blender; and
   mixing the combination for five to fifteen minutes;
   whereby a concrete is obtained.

10. A concrete comprising the cement blend according to claim 1 and an aggregate, wherein the cement blend comprises 45-25 wt. % of the concrete.

11. A cement blend for making concrete, the cement blend comprising:
    60-90 wt. % Portland cement
    0.1-6 wt. % fumed silica having an average particle size of from 1 to 150 microns;
    1-9 wt % hollow microspheres, wherein all solid components of the cement blend have an average particle size of from 1 to 150 microns.

* * * * *

UNITED STATES PATENT AND TRADEMARK OFFICE
CERTIFICATE OF CORRECTION

PATENT NO.        : 8,172,938 B2
APPLICATION NO.   : 13/002184
DATED             : May 8, 2012
INVENTOR(S)       : John Albright et al.

It is certified that error appears in the above-identified patent and that said Letters Patent is hereby corrected as shown below:

In Column 1, Line 1, delete "Alright," and insert --Albright--, therefor.

In Column 16, Line 66, after "properties" insert --.--.

In Column 27, Line 14, delete "1/4" and insert --1/2--, therefor.

In Column 36, Line 22, delete "dispersed:" and insert --dispersed.--, therefor.

In Column 37, Line 61, delete "pozzalans" and insert --pozzolans--, therefor.

In Column 37, Line 64, delete "wwwleuclidchemical.com" and insert --www.euclidchemical.com--, therefor.

In Column 39, Line 40, after "forms" insert --.--.

In Column 40, Line 4, delete "Hueume" and insert --Hueneme--, therefor.

In Column 41, Line 17, in Claim 1, after "cement" insert --.--.

In Column 41, Line 20, in Claim 1, delete "1.9 wt" and insert --1-9 wt--, therefor.

In Column 42, Line 38, in Claim 9, after "blender," delete "and".

In Column 42, Line 48, in Claim 11, after "cement" insert --.--.

In Column 42, Line 51, in Claim 11, delete "wt" and insert --wt.--, therefor.

Signed and Sealed this
Second Day of October, 2012

David J. Kappos
*Director of the United States Patent and Trademark Office*